US012737351B1

(12) United States Patent
Schilders

(10) Patent No.: US 12,737,351 B1
(45) Date of Patent: Sep. 15, 2026

(54) GRAPH-BASED MODELS USING EXTERNAL FILES

(71) Applicants: Infosys Limited, Bangalore (IN); InvertIT Inc., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 19/094,766

(22) Filed: Mar. 28, 2025

(30) Foreign Application Priority Data

Mar. 28, 2025 (IN) ............................ 202541030581

(51) Int. Cl.
*G06F 16/23* (2019.01)
*G06F 16/21* (2019.01)

(52) U.S. Cl.
CPC ........ *G06F 16/2379* (2019.01); *G06F 16/211* (2019.01)

(58) Field of Classification Search
CPC ........................... G06F 16/2379; G06F 16/211
See application file for complete search history.

(56) References Cited

U.S. PATENT DOCUMENTS

| | | | | |
|---|---|---|---|---|
| 12,164,569 | B2 | 12/2024 | Schilders | |
| 12,222,986 | B2 | 2/2025 | Schilders | |
| 2017/0177744 | A1* | 6/2017 | Potiagalov | G06F 16/26 |
| 2021/0157850 | A1* | 5/2021 | Tong | G06F 16/245 |
| 2024/0256603 | A1 | 8/2024 | Schilders | |
| 2025/0077585 | A1* | 3/2025 | Uceda-Sosa | G06F 16/90335 |

* cited by examiner

*Primary Examiner* — William P Bartlett
(74) *Attorney, Agent, or Firm* — Finnegan, Henderson, Farabow, Garrett & Dunner LLP

(57) ABSTRACT

An overlay system is provided that includes a storage element and processing circuitry coupled thereto. The storage element stores an executable graph-based model that includes a plurality of node groups, a file export overlay node, and a file mapping overlay node. The processing circuitry creates, using the file export overlay node and the file mapping overlay node, a master file that implements the executable graph-based model in a server associated with the overlay system. The processing circuitry creates, in the master file, a plurality of schemas that implements the plurality of node groups. In a first schema, the processing circuitry creates a first set of fields that implements a first set of active nodes of the first node group. Further, for the first field, the processing circuitry creates a first set of records that implements a second set of active nodes associated with the first active node.

18 Claims, 20 Drawing Sheets

1100

300B

500

File import overlay node 708

File mapping overlay node 710

Executable graph-based model 706

712

714

External file 702

Plurality of schemas 704

First schema 704a

Second schema 704b

Third schema 704c

Nth schema 704n

800F

GRAPH-BASED MODELS USING EXTERNAL FILES

FIELD OF THE DISCLOSURE

Various embodiments of the present disclosure relate generally to graph-based models. More specifically, various embodiments of the present disclosure relate to graph-based models with external files.

BACKGROUND

Data is essential across all domains, including artificial intelligence (AI), machine learning (ML), healthcare, finance, and cybersecurity. In AI and ML, data may be the foundation for training models, making predictions, and automating decision-making. In healthcare, patient records, diagnostic data, and real-time monitoring may be leveraged to enhance treatment accuracy and predictive analytics. Similarly, in finance, data may be processed for risk assessment, fraud detection, and algorithmic trading. In these domains for execution of the applications, the data may be required to be loaded from external storage systems or remote databases to a compute environment for execution. Further, post the execution, the processed data may be required to be unloaded and stored in the external system. However, the loading and unloading of the data may incur significant computational overheads. This may lead to delayed execution of the operations which may affect the overall system performance and may even prove to be fatal in time-critical tasks. Therefore, there may be a need for efficient handling of data for real-time processing and low-latency applications.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating graph-based models with external files are provided substantially as shown in, and described in connection with, at least one of the figures.

Certain embodiments of the disclosure may disclose an overlay system. The overlay system comprises a storage element and processing circuitry that is coupled to the storage element. The storage element is configured to store an executable graph-based model that includes a plurality of node groups, with each node group comprising a plurality of active nodes. The executable graph-based model includes a file export overlay node that is configured to extend functionality of the executable graph-based model, and a file mapping overlay node that is configured to extend functionality of the file export overlay node. The processing circuitry is configured to receive a stimulus associated with the overlay system. The processing circuitry is further configured to create, based on the stimulus, using the file export overlay node and the file mapping overlay node, a master file that implements the executable graph-based model, in a server associated with the overlay system. Further, the processing circuitry is configured to create, in the master file, a plurality of schemas that implements the plurality of node groups, with a first schema created for a first node group. Further, the processing circuitry is configured to create, in the first schema, a first set of fields that implements a first set of active nodes of the plurality of active nodes of the first node group, with a first field created for a first active node. The processing circuitry is further configured to create, for the first field, a first set of records that implements a second set of active nodes, of the plurality of active nodes of the first node group, associated with the first active node.

In some embodiments, the executable graph-based model further includes (i) a schema export overlay node that is configured to extend functionality of the first node group, and (ii) a schema mapping overlay node that is configured to extend functionality of the schema export overlay node. The processing circuitry is further configured to determine, using the schema mapping overlay node, the first node group in the executable graph-based model. The first schema, that implements the first node group, is created in the master file using the schema export overlay node.

In some embodiments, the executable graph-based model further includes (i) a data export overlay node that is configured to extend functionality of the first node group, and (ii) a data mapping overlay node that is configured to extend functionality of the data export overlay node. The processing circuitry is further configured to determine, using the data mapping overlay node, the first set of active nodes of the plurality of active nodes of the first node group. The first set of fields, that implements the first set of active nodes, is created in the master file using the data export overlay node.

In some embodiments, the processing circuitry is further configured to determine, using the data mapping overlay node, the second set of active nodes associated with the first active node of the first set of active nodes. The first set of records, that implements the second set of active nodes, is created in the master file using the data export overlay node.

In some embodiments, one or more operations are executed in the executable graph-based model. The execution of the one or more operations results in a modification of the executable graph-based model. The processing circuitry is further configured to modify the master file based on the modification of the executable graph-based model.

In some embodiments, the modification of the executable graph-based model corresponds to at least one of (i) an addition of a third set of active nodes in the first node group of the executable graph-based model, (ii) an update of a first subset of active nodes of the first set of active nodes of the first node group, and (iii) a deletion of a second subset of active nodes of the first set of active nodes.

In some embodiments, the modification of the executable graph-based model corresponds to at least one of (i) an addition of a third set of active nodes associated with the first active node, (ii) an update of a first subset of active nodes of the second set of active nodes associated with the first active node, and (iii) a deletion of a second subset of active nodes of the second set of active nodes.

In some embodiments, the modification of the executable graph-based model corresponds to an addition of a third set of active nodes in the first node group of the executable graph-based model. The executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node. The processing circuitry is further configured to identify, using the data mapping overlay node, the third set of active nodes added to the first node group. The processing circuitry is further configured to create, using the data export overlay node and the creation overlay node, a second set of fields that implements the identified third set of active nodes in the first schema of the master file.

In some embodiments, the modification of the executable graph-based model corresponds to an addition of a third set of active nodes associated with the first active node. The executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node. The processing circuitry is further configured to identify, using the data mapping overlay node, the third set of active nodes added to the first active node. Further, the processing circuitry is configured to create, using the data export overlay node and the creation overlay node, a second set of records that implements the identified third set of active nodes for the first field of the first schema of the master file.

In some embodiments, the modification of the executable graph-based model corresponds to an update of a subset of active nodes of the first set of active nodes. The executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node. Further, the processing circuitry is configured to identify, using the data mapping overlay node, the subset of active nodes in the first node group. The processing circuitry is further configured to identify, using the data mapping overlay node, from the first set of fields, a subset of fields that implements the subset of active nodes. Further, the processing circuitry is configured to update, using the data export overlay node and the update overlay node, the subset of fields, of the first set of fields, based on the updated subset of active nodes of the first set of active nodes.

In some embodiments, the update of the subset of fields, of the first set of fields, is one of periodic or in real-time.

In some embodiments, the modification of the executable graph-based model corresponds to an update of a subset of active nodes of the second set of active nodes. The executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node. The processing circuitry is further configured to identify, using the data mapping overlay node, the subset of active nodes associated with the first active node. Further, the processing circuitry is configured to identify, using the data mapping overlay node, from the first set of records, a subset of records that implements the subset of active nodes. The processing circuitry is further configured to update, using the data export overlay node and the update overlay node, the subset of records, of the first set of records, based on the updated subset of active nodes of the second set of active nodes.

In some embodiments, the update of the subset of records, of the first set of records, is one of periodic or in real-time.

In some embodiments, the modification of the executable graph-based model corresponds to a deletion of a subset of active nodes of the first set of active nodes. The executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node. The processing circuitry is further configured to identify, using the data mapping overlay node, the subset of active nodes in the first node group. The processing circuitry is further configured to identify, using the data mapping overlay node, from the first set of fields, a subset of fields that implements the subset of active nodes. Further, the processing circuitry is configured to delete, using the data export overlay node and the delete overlay node, the subset of fields, of the first set of fields, based on the deleted subset of active nodes of the first set of active nodes.

In some embodiments, the modification of the executable graph-based model corresponds to a deletion of a subset of active nodes of the second set of active nodes. The executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node. The processing circuitry is further configured to identify, using the data mapping overlay node, the subset of active nodes associated with the first active node. Further, the processing circuitry is configured to identify, using the data mapping overlay node, from the first set of records, a subset of records that implements the subset of active nodes. The processing circuitry is further configured to delete, using the data export overlay node and the delete overlay node, the subset of records, of the first set of records, based on the deleted subset of active nodes of the second set of active nodes.

In some embodiments, the executable graph-based model is one of persistable or non-persistable. Based on the executable graph-based model being persistable, the executable graph-based model is stored in the storage element. Further, based on the executable graph-based model being non-persistable, the executable graph-based model ceases to exist from the storage element upon expiration of a threshold time-period.

In some embodiments, the executable graph-based model is a run-time model that includes (i) an executable graph-based model template that defines a graph structure and (ii) an executable graph-based model instance that is an implementation of the executable graph-based model template. The processing circuitry creates the master file that implements the executable graph-based model instance in the server associated with the overlay system.

Certain additional embodiments of the disclosure may disclose an overlay system. The overlay system comprises a storage element and processing circuitry that is coupled to the storage element. The processing circuitry is configured to receive a stimulus associated with the overlay system. Further, the processing circuitry is configured to create, in the storage element, based on the stimulus, an executable graph-based model that implements an external file associated with the overlay system. The processing circuitry is further configured to create, in the executable graph-based model, a plurality of node groups that implements a plurality of schemas associated with the external file, with a first node group created for a first schema. Further, the processing circuitry is configured to create, in the first node group, a first set of active nodes that implements a first set of fields associated with the first schema, with a first active node created for a first field. The processing circuitry is further configured to create, in the first node group, a second set of active nodes associated with the first active node. The second set of active nodes implements a first set of records associated with the first field. The processing circuitry is further configured to execute one or more operations in the executable graph-based model.

In some embodiments, the processing circuitry is further configured to create, in the storage element, (i) a file import overlay node that is configured to extend functionality of the executable graph-based model, and (ii) a file mapping overlay node that is configured to extend functionality of the file import overlay node. The processing circuitry is further configured to determine, using the file import overlay node, the first schema of the plurality of schemas. The first node group, that implements the first schema, is created using the file mapping overlay node.

In some embodiments, the processing circuitry is further configured to create, in the executable graph-based model, a schema import overlay node that is configured to extend functionality of the first node group, and a schema mapping overlay node that is configured to extend functionality of the schema import overlay node. The processing circuitry is further configured to determine, using the schema import overlay node, the first field of the first set of fields associated with the first schema. The first active node, that implements the first field, is created using the schema mapping overlay node.

In some embodiments, the processing circuitry is further configured to create, in the executable graph-based model, a data import overlay node that is configured to extend functionality of the first node group, and a data mapping overlay node that is configured to extend functionality of the data import overlay node. Further, the processing circuitry is configured to determine, using the data import overlay node, the first set of records associated with the first field. The second set of active nodes, that implements the first set of records, is created using the data mapping overlay node.

In numerous embodiments, a method is disclosed. The method comprises receiving, by processing circuitry of an overlay system, a stimulus associated with the overlay system. An executable graph-based model is stored in a storage element of the overlay system. The executable graph-based model includes a plurality of node groups, with each node group comprising a plurality of active nodes, a file export overlay node that is configured to extend functionality of the executable graph-based model, and a file mapping overlay node that is configured to extend functionality of the file export overlay node. The method further includes creating, by the processing circuitry, based on the stimulus, using the file export overlay node and the file mapping overlay node, a master file that implements the executable graph-based model, in a server associated with the overlay system. The method further includes creating, by the processing circuitry, in the master file, a plurality of schemas that implements the plurality of node groups, with a first schema created for a first node group. The method further includes creating, by the processing circuitry, in the first schema, a first set of fields that implements a first set of active nodes of the plurality of active nodes of the first node group, with a first field created for a first active node. The method further includes creating, by the processing circuitry, for the first field, a first set of records that implements a second set of active nodes, of the plurality of active nodes of the first node group, associated with the first active node.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
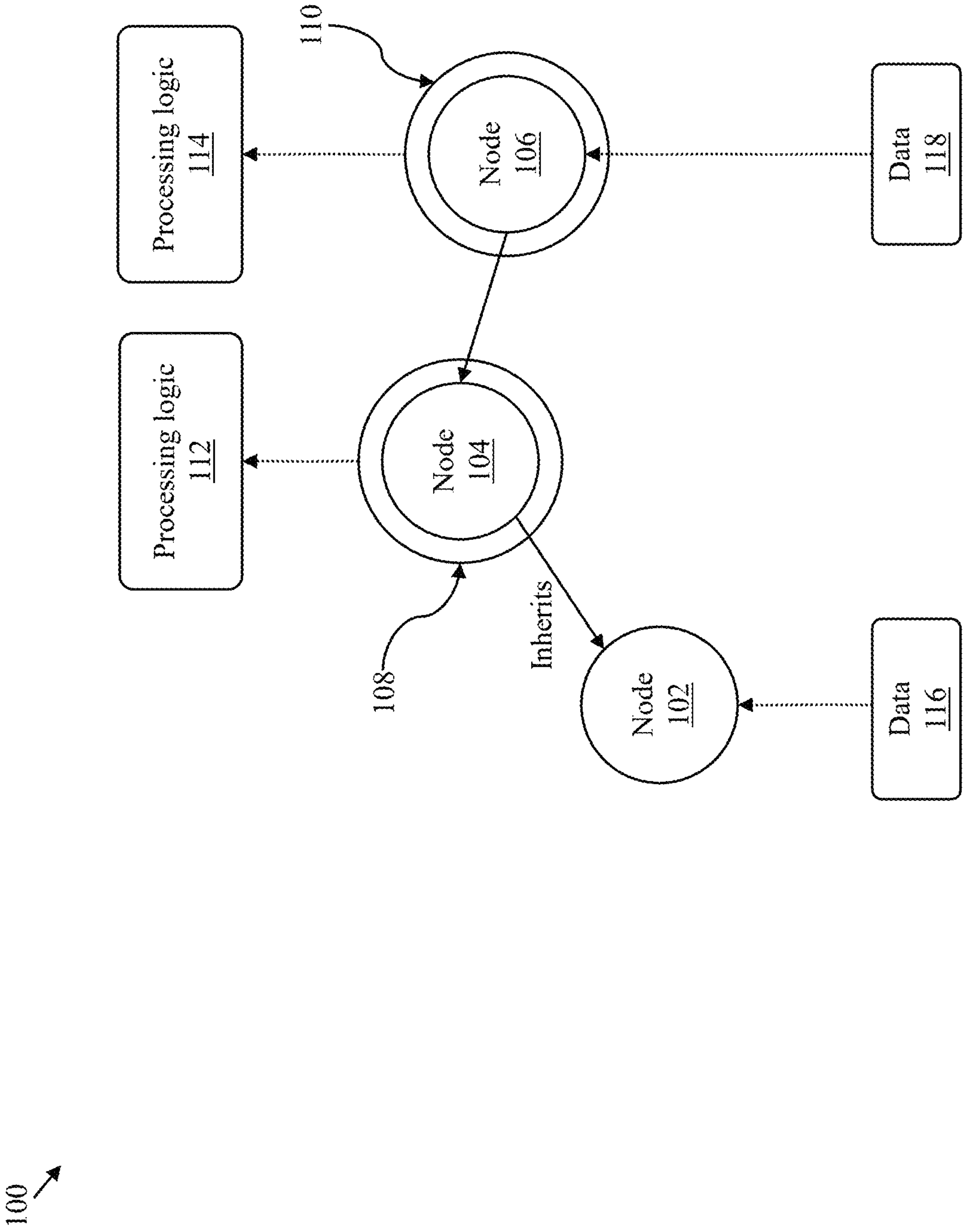
FIG. 1 is a graph that illustrates a composition of an executable graph-based model, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Data is essential across all domains, including artificial intelligence (AI), machine learning (ML), healthcare, finance, and cybersecurity. In these domains, the data may be used for various tasks. For example, the data may be used for diagnostics in healthcare, fraud detection and risk assessment in finance, and as training data in AI and ML. The data required for the execution of these tasks may be stored in remote databases and may be required to be loaded prior to the utilization thereof. Similarly, once the tasks are completed, the processed data may need to be stored back into the databases. However, the loading and unloading of the data may incur additional computational overhead that may introduce latency in the execution of the tasks. Delay in loading of the data may prove to be fatal in time-critical applications such as healthcare, finance, or the like. That is to say, any delay in data retrieval may prove to be fatal in case of time-critical tasks.

Additionally, the data may typically be stored in the form of files such as JavaScript Object Notation (JSON) files, Extensible Markup Language (XML) files, excel files, or the like. Each of these files may have a unique schema associated therewith. The schema of a file may define the structure and constraint of the data stored within the file. For example, the schema may define the data type of the elements included within the file and any rules or constraints that the data has to follow. In many cases, the data stored in a file having a corresponding schema may not be suitable for the task at hand, necessitating its transformation into a different schema suitable for the execution of the task. For such transformation, an understanding of how the data is stored and the location thereof may be required. This additional processing step may further impact the efficiency and performance of task execution.

The present disclosure is directed to the facilitation of external files using executable graph-based models. The executable graph-based model is a customized hypergraph with hyper-edges that are realized by way of executable nodes. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features in the overlay system. Each overlay node is associated with one or more nodes (for example, a vertex node, an edge node, or the like) of the executable graph-based model and includes a corresponding processing logic that when executed implements a functionality thereof on the associated nodes. Hence, the processing logic is implemented within the executable graph-based model and is not required to be retrieved from any external system.

The overlay system disclosed herein facilitates various operations associated with external files in the executable graph-based model. The external files such as JSON files, excel files, or the like, may have a schema associated therewith. The schema of a file may define the structure and constraint of the data stored within the file and may ensure data integrity and correctness of the data. For example, in a JSON file, the data is stored as documents in the form of 'key: value' pairs, in an XML file, the data is stored as nested elements with attributes and text values, and in an excel file, the data is stored in rows and columns where each column is a field and each row is a record.

The overlay system disclosed herein provides a way to implement an external file as an executable graph-based model. That is to say, the executable graph-based model may be created, in the overlay system, to implement the external file. The executable graph-based model may be created using one or more file overlay nodes. Further, in the executable graph-based model, various elements of the external file such as the schema of the external file, various fields of the external file, and records of the corresponding field may be implemented by way of the one or more file overlay nodes.

The generation of the executable graph-based model for the external file may prevent the latency associated with the loading and unloading of the external file as the capabilities associated with the overlay system may be leveraged by way of the executable graph-based model. That is to say, the execution of a task utilizing the external file may be more performant upon being implemented as the executable graph-based model due to the efficient computing and processing capabilities as well as the low-latency behavior of the overlay system.

The executable graph-based model implemented for data included within the external file may be further implemented as a master file in a server by way of one or more file overlay nodes. The data included within the executable graph-based model may be implemented in the master file in a schema based on user-demand. That is to say, the schema of the master file may be different from the schema of the external file. This facility is achieved due to the flexibility of the data being represented in the executable graph-based model.

The time required for translating the schema of the external file to a schema required for the execution of a task may be prevented as intricacies may be handled seamlessly by the overlay system without requiring manual effort. Thus, the present disclosure presents a solution for the effective execution of tasks based on the real-time availability of the data and providing the data in the format required by the user by implementing the executable graph-based model as the master file. Such implementations are useful in the case of AI and ML applications where real-time processing of data is required for execution of real-time tasks. It is appreciated that the human mind is not equipped to create the master file that implements the executable graph-based model in the server associated with the overlay system. It is appreciated that the approaches discussed herein improve the technical field of computer performance by reducing time complexity.

FIGURE DESCRIPTION

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
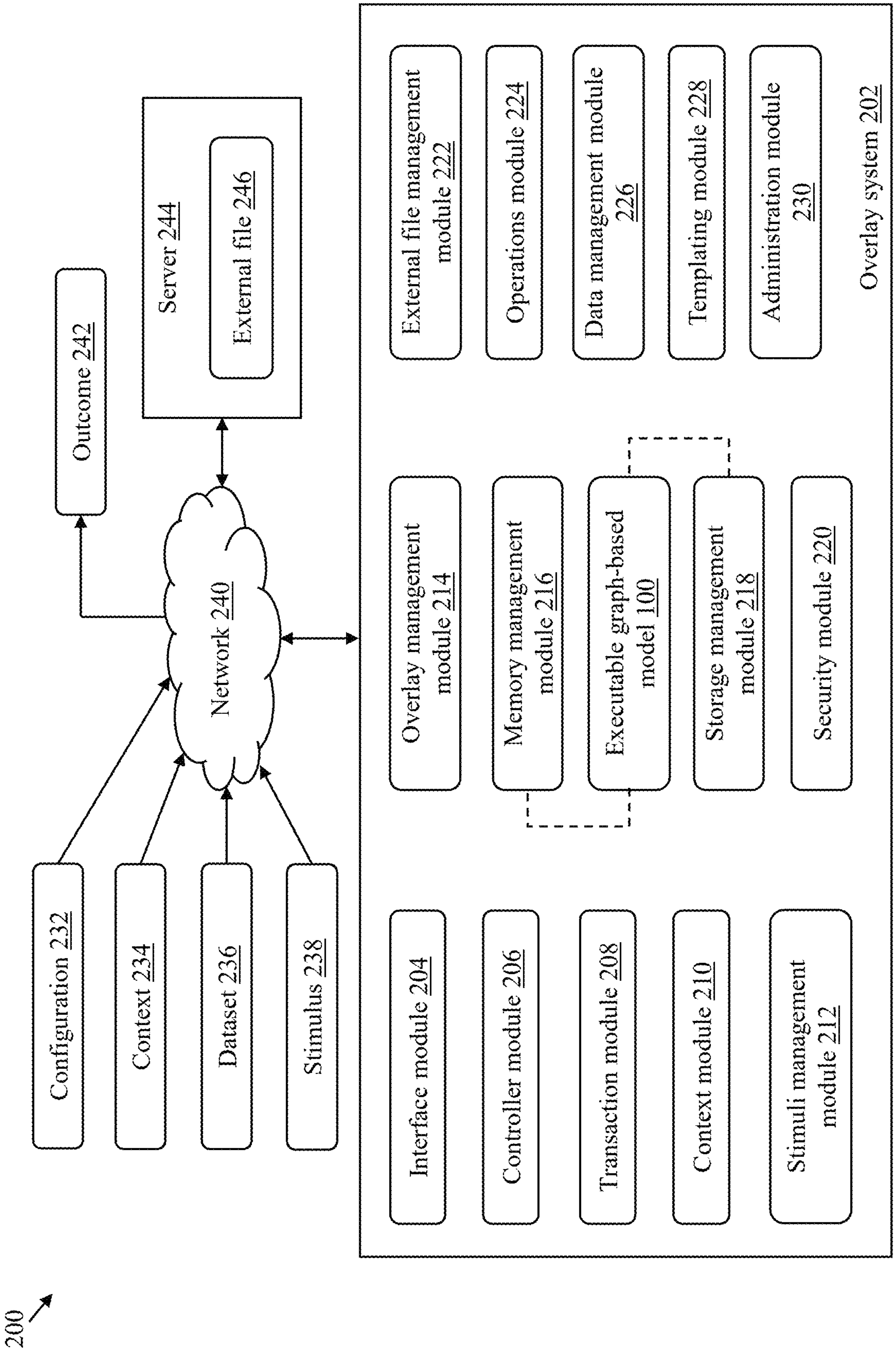
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, an overlay management module 214, a memory management module 216, a storage management module 218, a security module 220, an external file management module 222, an operations module 224, a data management module 226, a templating module 228, and an administration module 230. FIG. 2 further shows a configuration 232, a context 234, a dataset 236, a stimulus 238, a network 240, and an outcome 242. Additionally, the system environment 200 is shown to include a server 244. The server 244 may host an external file 246. In some embodiments, all the modules of the overlay system 202 except for the executable graph-based model 100 may collectively form processing circuitry that facilitates operations in the system environment 200.

The overlay system 202 may include suitable logic, circuitry, interfaces, and/or code, executable by the circuitry, that may be configured to facilitate one or more operations associated with the facilitation of the executable graph-based model 100 using the external file 246.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 232, the context 234, the dataset 236, and the stimulus 238 may be received by the interface module 204 via the network 240. Similarly, outputs (e.g., the outcome 242) produced by the overlay system 202 are passed by the interface module 204 to the network 240 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 238) and their associated contexts (such as the context 234) provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 238) and processes them based on a corresponding context (e.g., the context 234). The context 234 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 238 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 238 within the overlay system 202 is associated with the context 234 which is used to adapt the handling or processing of the stimulus 238 by the overlay system 202. That is to say that the handling or processing of the stimulus 238 is done based on the context 234 associated therewith. Hence, the stimulus 238 is a contextualized stimulus. Further, the context 234 may include details such as username, password, access token, device information, time stamp, one or more relevant identifiers (IDs), or the like, that are required for processing of the stimulus 238 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 234) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 238. As will be described in more detail below, the executable graph-based model 100 is configurable (e.g., via the configuration 232) so as only to execute within a given execution context for a given stimulus.

The stimuli management module 212 may include suitable logic, circuitry, interfaces, and/or code, executable by the circuitry, configured to process externally received stimuli (e.g., the stimulus 238) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 238) can be either externally or internally generated. In an example, the stimulus 238 may be a message that is internally triggered (e.g., generated) from any of the modules within the overlay system 202. Such internal generation of the stimulus 238 indicates that something has happened within the overlay system 202 and subsequent handling by one or more other modules within the overlay system 202 may be required. Internal stimulus 238 can also be triggered (e.g., generated) from the execution of processing logic associated with overlays within the executable graph-based model 100. In another example, the stimulus 238 may be externally triggered and may be generated based on an input received via a user interface associated with the controller module 206. The externally triggered stimulus 238 may be received in the form of a signal, a textual, an audio, or a visual input. The externally triggered stimulus 238 may be associated with the intent of a user to execute an operation indicated by the stimulus 238. The operation is executed in accordance with information included in the set of contexts 234 associated with the stimulus 238.

The stimuli management module 212 may receive the stimuli (such as the stimulus 238) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 232) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on processing of data by any of its nodes. In some examples, the processing of a stimulus (such as the stimulus 238) results in the generation, communication, or processing of data that further results in one or more outcomes (e.g., the outcome 242) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 224 of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within the executable graph-based model 100). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more of the modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 232) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 216 is communicatively coupled (e.g., connected either directly or indirectly) to one or more overlays within the executable graph-based model 100.

The storage management module 218 may include suitable logic, circuitry, interfaces, and/or code, executable by the circuitry, configured to manage the temporary or permanent storage of data associated with the overlay system 202. The storage management module 218 is any suitable low-level storage device solution (such as a file system) or any suitable high-level storage technology such as another database technology (e.g., relational database management system (RDBMS) or NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network such as the network 240. As will be described in more detail later in the present disclosure, the storage management module 218 uses manifests to manage the interactions between the storage device and the modules within the overlay system 202. In one embodiment, the storage management module 218 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 216 and the storage management module 218. The memory management module 216 and the storage management module 218 may facilitate such operations by interacting with the storage device that stores the executable graph-based model 100. The overlay system 202 further includes a plurality of manifest storages. The manifest storages are used by the memory management module 216 and the storage management module 218 to facilitate storage of manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 6.

The security module 220 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 220 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 220 can implement one or more layers of data protection to ensure that the PII or PHI are correctly processed and stored. In an additional example, in implementations whereby the overlay system 202 operates on United States of America citizen medical data, the security module 220 may enforce additional protections or policies as defined by the United States Health Insurance Portability and Accountability Act (HIPAA). Similarly, if the overlay system 202 is deployed in the European Union (EU), the security module 220 may enforce additional protections or policies to ensure that the data processed and maintained by the overlay system 202 complies with the General Data Protection Regulation (GDPR). In one embodiment, the security module 220 is communicatively coupled (e.g., connected either directly or indirectly) to one or more overlays within the executable graph-based model 100, thereby directly connecting security execution to the data/information in the executable graph-based model 100. The security module 220 thus acts as a centralized coordinator that works in conjunction with the overlay management module 214 for managing and executing security-based overlays.

The external file management module 222 may include suitable logic, circuitry, interfaces, and/or code, executable by the circuitry, configured to facilitate a creation of the executable graph-based model 100 using the external file 246. The external file 246 may refer to a structured collection of data. The external file 246 may be associated with a specific format. The format may correspond to a '.txt' format that is associated with a text file, a '.xlsx' format that is associated with an excel file, a 'json' format that is associated with a JavaScript Object Notation (JSON) file, or the like. The external file 246 may include a plurality of schemas. A schema may refer to a structure or blueprint that defines how data is organized and how relationships among data are maintained in a file. The schema may outline data types, constraints, relationships, and other metadata for the data being stored in the file. Further, each schema may include a plurality of fields. A field may refer to a logical structure that defines and organizes the data within a schema. A field may include a set of data records. Each data record may refer to a value corresponding to the field. A column may be an example of a field in an excel file, while a row may be an example of a data record in the excel file. Similarly, a key may be an example of a field in a JSON file, whereas a JSON object may be an example of a data record in the JSON file. In some embodiments, the external file management module 222 may be configured to facilitate creation of the external file 246 using the executable graph-based model 100.

The operations module 224 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The data management module 226 may include suitable logic, circuitry, interfaces, and/or code, executable by the circuitry, configured to manage all data or information within the overlay system 202 (e.g., the dataset 236) for a given application. Operations performed by the data management module 226 include data loading, data unloading, data modeling, and data processing. The data management module 226 is communicatively coupled (e.g., connected either directly or indirectly) to one or more other modules within the overlay system 202 to complete some or all of these operations. For example, data storage is handled by the data management module 226 in conjunction with the storage management module 218.

The templating module 228 may include suitable logic, circuitry, interfaces, and/or code, executable by the circuitry, configured to enable the overlay system 202 to implement a templated version of the executable graph-based model 100. The templating module 228 may be configured to create an executable graph-based model template that defines a graph structure and an executable graph-based model instance that is an implementation of the executable graph-based model template to implement the templated version of the executable graph-based model 100. Notably, the templating module 228 ensures ontology integrity by enforcing the structure and rules of a template when generating instances of the template at run-time. Ontology integrity refers to the consistency, accuracy, and correctness of an ontology. Thus, the templating module 228 ensures that the consistency, accuracy, and correctness of the ontology of the executable graph-based model 100 is maintained while generating the instances of the template at run-time. The templating module 228 may be communicatively coupled (i.e., connected either directly or indirectly) to one or more nodes and/or one or more overlays within the executable graph-based model 100.

The administration module 230 may include suitable logic, circuitry, interfaces, and/or code, executable by the circuitry, configured to facilitate management of configurable aspects of the overlay system 202. The administration module 230 may facilitate administration of the overlay system 202 by an administrator. In some embodiments, the administration module 230 may facilitate the administrator to initiate the creation of the executable graph-based model 100 using the external file 246. In some more embodiments, the administration module 230 may facilitate the administrator to initiate the creation of the external file 246 using the executable graph-based model 100. In one embodiment, the administration module 230 is communicatively coupled (e.g., connected either directly or indirectly) to one or more overlays within the executable graph-based model 100.

The server 244 may include suitable logic, circuitry, interfaces, and/or code, executable by the circuitry, configured to host or store the external file 246. The server 244 may be communicatively coupled to the overlay system 202 by way of the network 240. The server 244 may be realized through various web-based technologies, such as, but not limited to, a Java web-framework, a .NET framework, a Hypertext Preprocessor (PHP) framework, a python framework, or any other web-application framework. Examples of the server 244 include, but are not limited to, a personal computer, a laptop, or a network of computer systems.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or functional programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
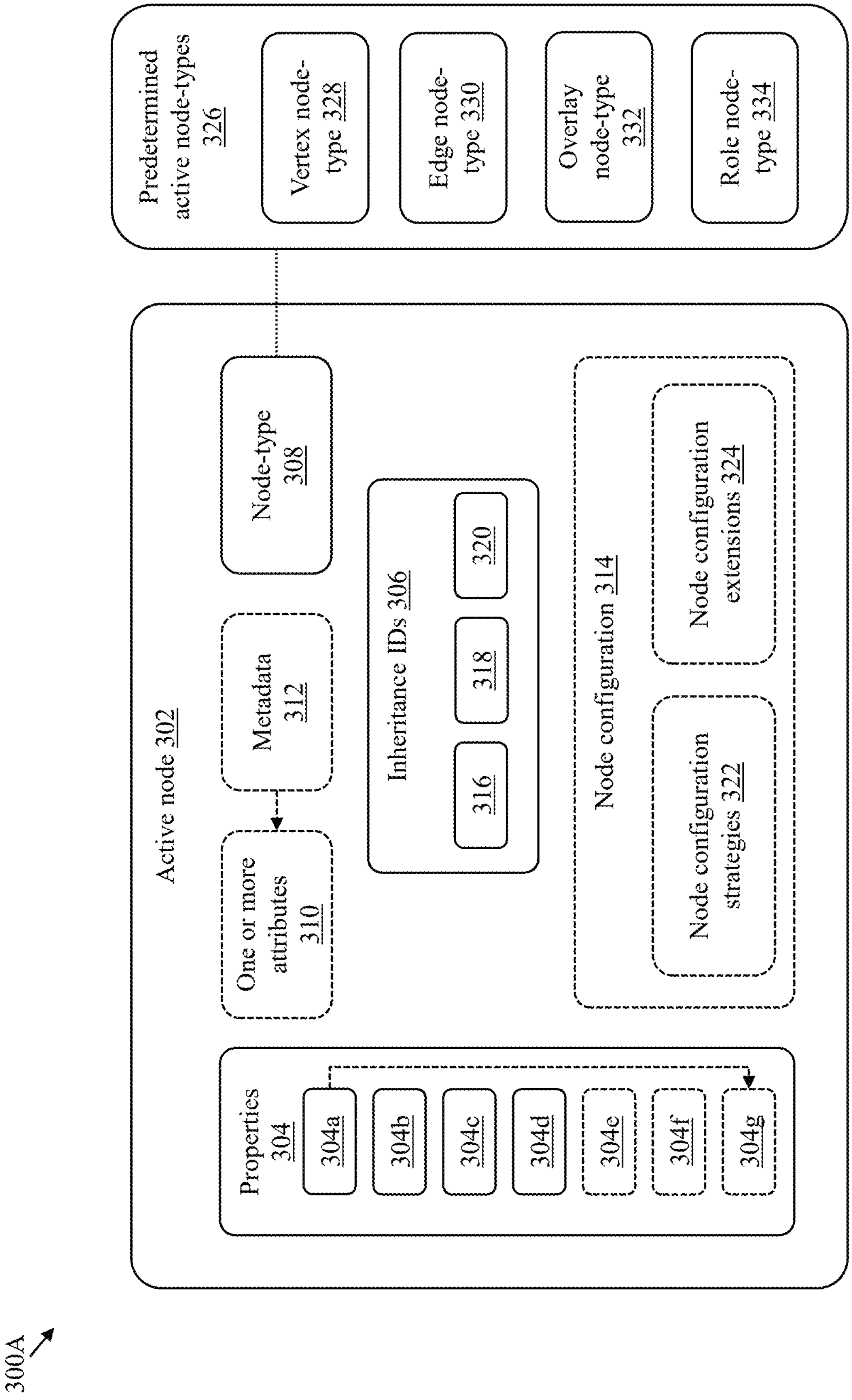
FIG. 3A is a block diagram that illustrates a generic structure of an active node within the executable graph-based model, consistent with disclosed embodiments of the present disclosure.

FIG. 3A is a block diagram 300A that illustrates a generic structure of an active node 302 within the executable graph-based model 100, consistent with disclosed embodiments of the present disclosure. Referring to FIG. 3, the active node 302 corresponds to a node of the executable graph-based model 100.

The active node 302 further corresponds to the core structure of the executable graph-based model 100 and forms the foundational building block for all data and processing logic within the executable graph-based model 100. The active node 302 includes properties 304, inheritance IDs 306, and a node-type 308. The active node 302 optionally includes one or more attributes 310, metadata 312 associated with the one or more attributes 310, and a node configuration 314.

The properties 304 of the active node 302 include a unique ID 304*a*, a version ID 304*b*, a namespace 304*c*, and a name 304*d*. The properties 304 optionally include one or more icons 304*e*, one or more labels 304*f*, and one or more alternative IDs 304*g*. The inheritance IDs 306 of the active node 302 include an abstract flag 316, a leaf flag 318, and a root flag 320. The node configuration 314 optionally includes one or more node configuration strategies 322 and one or more node configuration extensions 324.

The unique ID 304*a* is unique for each node within the executable graph-based model 100. The unique ID 304*a* is used to register, manage, and reference the active node 302 within the system (e.g., the overlay system 202). In some embodiments, the one or more alternative IDs 304*g* are associated with the unique ID 304*a* to help manage communications and connections with external systems (e.g., during configuration, sending stimuli, or receiving outcomes). The version ID 304*b* of the active node 302 is incremented when the active node 302 undergoes transactional change. This allows the historical changes between versions of the active node 302 to be tracked by modules or overlays within the overlay system 202. The namespace 304*c* of the active node 302, along with the name 304*d* of the active node 302, is used to help organize nodes within the executable graph-based model 100. That is, the active node 302 is assigned a unique name 304*d* within the namespace 304*c* such that the name 304*d* of the active node 302 need not be unique within the entire executable graph-based model 100, only within the context of the namespace 304*c* to which the active node 302 is assigned. The active node 302 optionally includes the one or more icons 304*e* which are used to provide a visual representation of the active node 302 when visualized via a user interface. The one or more icons 304*e* can include icons at different resolutions and display contexts such that the visualization of the active node 302 is adapted to different display settings and contexts. The active node 302 also optionally includes one or more labels 304*f* which are used to override the name 304*d* when the active node 302 is rendered or visualized.

The active node 302 supports the concept of inheritance of data and processing logic associated with any other node of the executable graph-based model 100 that is inherited by the active node 302. This allows the behavior and functionality of the active node 302 to be extended or derived from the inherited node of the executable graph-based model 100. The inheritance IDs 306 of the active node 302 indicate the inheritance-based information, which may apply to the active node 302. The inheritance IDs 306 comprise a set of Boolean flags that identify the inheritance structure of the active node 302. The abstract flag 316 allows the active node 302 to support the construct of abstraction. When the abstract flag 316 takes a value 'true', the active node 302 is flagged as abstract that is to say that it cannot be instantiated or created within an executable graph-based model (e.g., the executable graph-based model 100). Thus, in an instance when the active node 302 has the abstract flag 316 set to 'true', the active node 302 may only form the foundation of other nodes that inherit therefrom. By default, the abstract flag 316 of the active node 302 is set to 'false'. The leaf flag 318 is used to indicate whether any other node may inherit from the active node 302. If the leaf flag 318 is set to 'true', then no other node may inherit from the active node 302 (but unlike an abstract node, a node with the leaf flag 318 set to 'true' may be instantiated and created within the executable graph-based model 100). The root flag 320 is used to indicate whether the active node 302 inherits from any other node. If the root flag 320 is set to 'true', the active node 302 does not inherit from any other node. The active node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the active node 302 is used to extend the functionality of the active node 302. All nodes within the executable graph-based model 100 comprise a node-type that defines additional data structures and implements additional executable functionality. A node-type thus includes data structures and functionality that are common across all nodes that share that node-type. Therefore, composition of a node with a node-type improves extensibility by allowing the generation of specialized node functionalities for specific application areas. Such extensibility is not present in prior art graph-based models. As illustrated in FIG. 3A, the active node 302 and the node-type 308 are one logical unit that is not separated in the context of an executing system at run-time (e.g., in the context of execution of an executable graph-based model).

FIG. 3A further shows the plurality of predetermined active node-types 326 which provides a non-exhaustive list of node-types for the node-type 308 associated with the active node 302. The plurality of predetermined node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node-types 326 further includes an overlay node-type 332 and a role node-type 334. As will be described in more detail below, a node with the overlay node-type 332 is used to extend the functionality of a node, such as the active node 302, to incorporate processing logic. Unlike non-overlay nodes, an overlay node (e.g., a node having the overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type can have is not limited.

The one or more attributes 310 correspond to the data associated with the active node 302 (e.g., the data represented by the active node 302 within the executable graph-based model 100 as handled by the data management module 226). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the active node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the active node 302 further includes the metadata 312 (e.g., data stored as a name, a confidentiality indicator for indicating data as sensitive and/or confidential, an average processing time required for processing data, or the like) which is associated with either the active node 302 or an attribute (for example, the one or more attributes 310) of the active node 302. An attribute within the one or more attributes 310 may either have an independent state or a shared state. That is to say, an attribute may be a value-shared attribute or a non-value-shared attribute. An independent attribute has data that is not shared with any other active node within the executable graph-based model 100. Conversely, a shared attribute has data that is shared with one or more other active nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the active node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304*a* of the active node 302, which creates message source IDs. A further example of a concrete node configuration strategy is a versioning strategy, associated with the configuration of the version ID 304*b* of the active node 302, which supports major and minor versioning (depending on the type of transactional change incurred by the active node 302). The versioning strategy may be adapted to a native filing system of a user device hosting the overlay system 202 or a third-party data storage (for example, Snowflake®, or the like) associated with the overlay system 202. All attribute configurations examples of node configuration extensions 324.

Figure 3B:
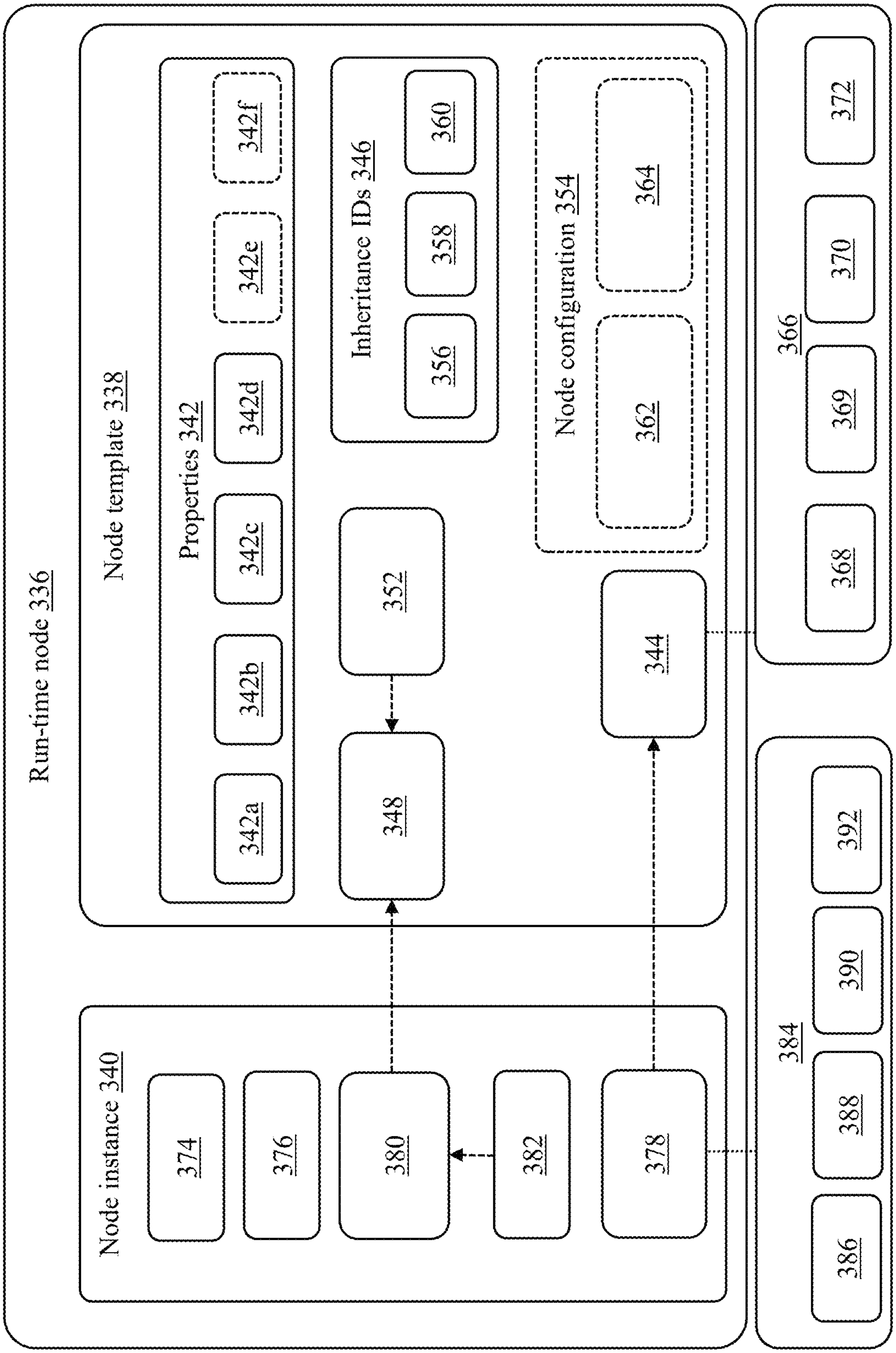
FIG. 3B is a block diagram that illustrates a generic structure of a run-time node within the executable graph-based model, consistent with disclosed embodiments of the present disclosure.

FIG. 3B is a block diagram 300B that illustrates a generic structure of a run-time node 336 within the executable graph-based model 100, consistent with disclosed embodiments of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 shown in FIG. 3B is a compositional structure that is generated and executed, at run-time as part of the executable graph-based model 100. In other words, the node template 338 is defined 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and a node configuration 354. The properties 342 of the node template 338 include a unique ID 342*a*, a version ID 342*b*, a namespace 342*c*, a name 342*d*, and optionally include one or more icons 342*e* and a set of labels 342*f*. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366. The plurality of predetermined node type templates 366 includes a vertex node type template 368, an edge node type template 369, a role node type template 370, and an overlay node type template 372. Further, the node instance 340 includes a unique ID 374, a version ID 376, a node type instance 378, and a set of attribute instances 380. The node instance 340 may optionally include metadata 382. FIG. 3B further shows a plurality of predetermined node type instances 384. The plurality of predetermined node type instances 384 includes a vertex node type instance 386, an edge node type instance 388, a role node type instance 390, and an overlay node type instance 392.

Each of the unique ID 342*a*, the version ID 342*b*, the namespace 342*c*, the name 342*d*, the one or more icons 342*e*, the set of labels 342*f*, the set of attribute templates 348, the metadata 352, the node configuration 354, the one or more node configuration strategies 362, the one or more node configuration extensions 364, the unique ID 374, the version ID 376, the set of attribute instances 380, and the metadata 382 corresponds to a node element. That is to say, the run-time node 336 includes the plurality of node elements, where the plurality of node elements includes the unique ID 342*a*, the version ID 342*b*, the namespace 342*c*, the name 342*d*, the one or more icons 342*e*, the set of labels 342*f*, the set of attribute templates 348, the metadata 352, the node configuration 354, the one or more node configuration strategies 362, the one or more node configuration extensions 364, the unique ID 374, the version ID 376, the set of attribute instances 380, and the metadata 382.

The unique ID 342*a* is unique for each node template within the executable graph-based model 100. Similarly, the unique ID 374 is unique for each node instance within the executable graph-based model 100. The unique ID 342*a* and the unique ID 374 are used to register, manage, and reference the node template 338 and the node instance 340, respectively, within the overlay system 202. The version ID 342*b* of the node template 338 is incremented when the node template 338 undergoes transactional change. Similarly, the version ID 376 of the node instance 340 is incremented when the node instance 340 undergoes transactional change. The namespace 342*c* of the node template 338, along with the name 342*d* of the node template 338, is used to help organize node templates within the executable graph-based model 100. That is, the node template 338 is assigned a unique name 342*d* within the namespace 342*c* such that the name 342*d* of the node template 338 need not be unique within the entire executable graph-based model 100, only within the context of the namespace 342*c* to which the node template 338 is assigned. The node template 338 optionally comprises one or more icons 342*e* which are used to provide a visual representation of the node template 338. The one or more icons 342*e* can include icons at different resolutions and display contexts such that the visualization of the node is adapted to different display settings and contexts. The node template 338 also optionally comprises the set of labels 342*f* which are used to override the name 342*d* when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model (such as the executable graph-based model 100). The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 has a description that is similar to the inheritance IDs 306. The abstract flag 356 has a description that is similar to the abstract flag 316, the leaf flag 358 has a description that is similar to the leaf flag 318, and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 378. The node type template 344 of the node template 338 is used to extend the functionality of the node template 338 by defining the standard set of capabilities, including data and associated behavior. The vertex node type template 368 (also referred to as a data node type) includes a template of common data structures and functionality related to the 'things' modeled in the graph (e.g., the data). The vertex node type instance 386 includes the common data structures and functionality related to the 'things' modeled in the graph based on the vertex node type template 368. The edge node type template 369 includes a template of common data structures and functionality related to joining two or more nodes. A node instance having the edge node type instance 388 may connect two or more nodes and thus the edge node type instance 388 constructs associations and connections between nodes (for example objects or 'things') within the executable graph-based model 100. The edge node type instance 388 is not restricted to the number of nodes that can be associated or connected by a node having the edge node type instance 388. The data structures and functionality of the edge node type instance 388 thus define a hyper-edge which allows two or more nodes to be connected through a defined set of roles. The role node type template 370 includes a template of common data structures and functionality related to defining a connective relationship between the two or more nodes, and hence, allows an edge node to connect two or more nodes such that the two or more nodes may have more than one relationship therebetween. A node instance having the role node type instance 390 defines the connective relationship between two or more nodes.

The overlay node type template 372 is used to extend the functionality of a node template (e.g., the node template 338) to incorporate processing logic. Similarly, the overlay node type instance 392 is used to extend the functionality of a node instance (e.g., the node instance 340) to incorporate processing logic.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, value type, and value triplet) is associated with either the node template 338 or one or more of the set of attribute templates 348 of the node template 338. Similarly, the node instance 340 also optionally comprises the metadata 352 (e.g., data stored as a name, value type, and value triplet) which is associated with either the node instance 340 or one or more of the set of attribute instances 380.

The node configuration 354 provides a high degree of configurability for the different elements of a node template and/or node instance. An example of a concrete node configuration strategy is an ID strategy, associated with the configuration of the unique ID 342*a* of the node template 338. A further example of a concrete node configuration strategy is a versioning strategy, associated with the configuration of the version ID 342*b* of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Although it is provided that the node template 338 is associated with one node instance (e.g., the node instance 340), the scope of the present disclosure is not limited to it. In other embodiments, the node template 338 may be further associated with two or more node instances where the two or more node instances correspond to two or more implementations of the node template 338, respectively.

Figure 4:
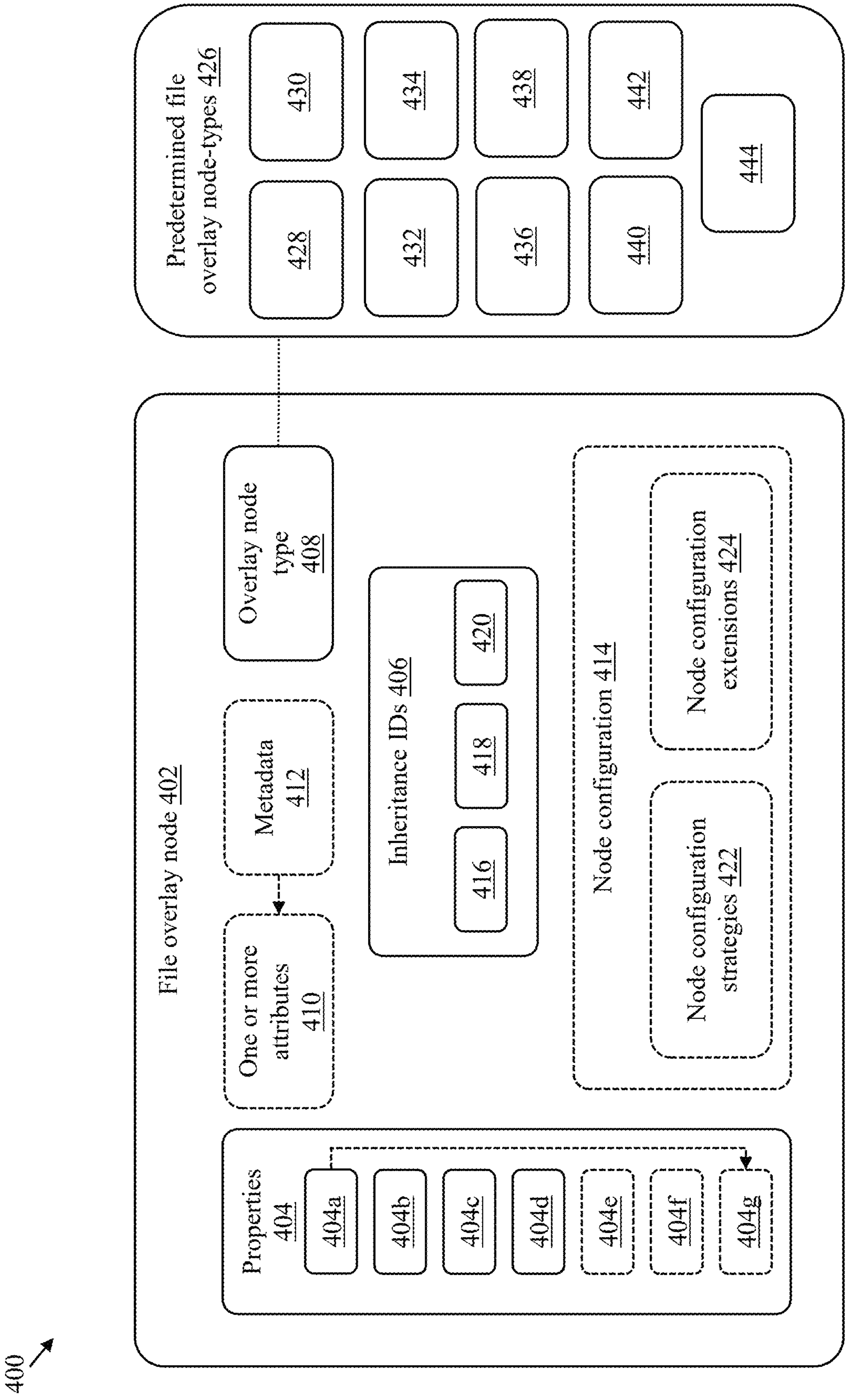
FIG. 4 is a block diagram that illustrates a generic structure of a file overlay node associated with the executable graph-based model, consistent with disclosed embodiments of the present disclosure.

FIG. 4 is a block diagram 400 that illustrates a generic structure of a file overlay node 402 associated with the executable graph-based model 100, consistent with disclosed embodiments of the present disclosure. Referring to FIG. 4, the file overlay node 402 corresponds to the core structure of the executable graph-based model 100 and forms the foundational building block for various data and processing logics within the executable graph-based model 100. The file overlay node 402 includes properties 404, inheritance IDs 406, and an overlay node-type 408. The file overlay node 402 optionally includes one or more attributes 410, metadata 412 associated with the one or more attributes 410, and a node configuration 414.

The properties 404 of the file overlay node 402 include a unique ID 404*a*, a version ID 404*b*, a namespace 404*c*, and a name 404*d*. The properties 404 optionally include one or more icons 404*e*, one or more labels 404*f*, and one or more alternative IDs 404*g*.

The properties 404 of the file overlay node 402 is the same as the properties 304 of the active node 302. In other words, the unique ID 404*a*, the version ID 404*b*, the namespace 404*c*, the name 404*d*, the one or more icons 404*e*, the one or more labels 404*f*, and the one or more alternative IDs 404*g* are same as the unique ID 304*a*, the version ID 304*b*, the namespace 304*c*, the name 304*d*, the one or more icons 304*e*, the one or more labels 304*f*, and the one or more alternative IDs 304*g*, respectively, of the active node 302.

The inheritance IDs 406 of the file overlay node 402 include an abstract flag 416, a leaf flag 418, and a root flag 420. The inheritance IDs 406 of the file overlay node 402 is same as the inheritance IDs 306 of the active node 302. In other words, the abstract flag 416, the leaf flag 418, and the root flag 420 are the same as the abstract flag 316, the leaf flag 318, and the root flag 320 of the active node 302, respectively.

The node configuration 414 optionally includes one or more node configuration strategies 422 and one or more node configuration extensions 424. The node configuration 414 is the same as the node configuration 314 of the active node 302. In other words, the one or more node configuration strategies 422 and one or more node configuration extensions 424 of the file overlay node 402 are the same as the node configuration strategies 322 and the one or more node configuration extensions 324 of the active node 302, respectively.

FIG. 4 further shows a plurality of predetermined file overlay node-types 426 which provides a non-exhaustive list of overlay node-types for the overlay node-type 408 associated with the file overlay node 402. The plurality of predetermined file overlay node-types 426 includes a file import overlay node type 428, a file mapping overlay node type 430, a schema import overlay node type 432, a schema mapping overlay node type 434, a data import overlay node type 436, and a data mapping overlay node type 438.

The file overlay node 402 with the file import overlay node type 428 may be referred to as the file import overlay node. Further, the file overlay node 402 with the file mapping overlay node type 430 may be referred to as the file mapping overlay node. The file import overlay node may be configured to facilitate determination of one or more schemas of the plurality of schemas in the external file 246. Further, the file mapping overlay node may facilitate creation of one or more node groups that implement the determined one or more schemas in the executable graph-based model 100.

In some embodiments, the file overlay node 402 with the schema import overlay node type 432 may be referred to as the schema import overlay node. Further, the file overlay node 402 with the schema mapping overlay node type 434 may be referred to as the schema mapping overlay node. The schema import overlay node may be configured to facilitate determination of one or more fields of a schema in the external file 246. Further, the schema mapping overlay node may facilitate creation of one or more active nodes that implement the determined one or more fields in the executable graph-based model 100, respectively.

The file overlay node 402 with the data import overlay node type 436 may be referred to as the data import overlay node. Further, the file overlay node 402 with the data mapping overlay node type 438 may be referred to as the data mapping overlay node. The data import overlay node may be configured to facilitate determination of one or more data records of a field in the external file 246. Further, the data mapping overlay node may facilitate creation of one or more active nodes that implement the determined one or more data records in the executable graph-based model 100, respectively.

In some embodiments, the plurality of predetermined file overlay node-types 426 may further include a file export overlay node type 440, a schema export overlay node type 442, and a data export overlay node type 444.

The file overlay node 402 with the file export overlay node type 440 may be referred to as the file export overlay node. The file export overlay node and the file mapping overlay node may be configured to facilitate creation of the external file 246 using the executable graph-based model 100.

The file overlay node 402 with the schema export overlay node type 442 may be referred to as the schema export overlay node. The schema export overlay node and the schema mapping overlay node may be configured to facilitate creation of one or more schemas in the external file 246 based on the executable graph-based model 100.

The file overlay node 402 with the data export overlay node type 444 may be referred to as the data export overlay node. The data export overlay node and the data mapping overlay node may be configured to facilitate creation of one or more fields in the external file 246 based on the executable graph-based model 100. The data export overlay node and the data mapping overlay node may be further configured to facilitate creation of one or more data records in the external file 246 based on the executable graph-based model 100.

Figure 5:
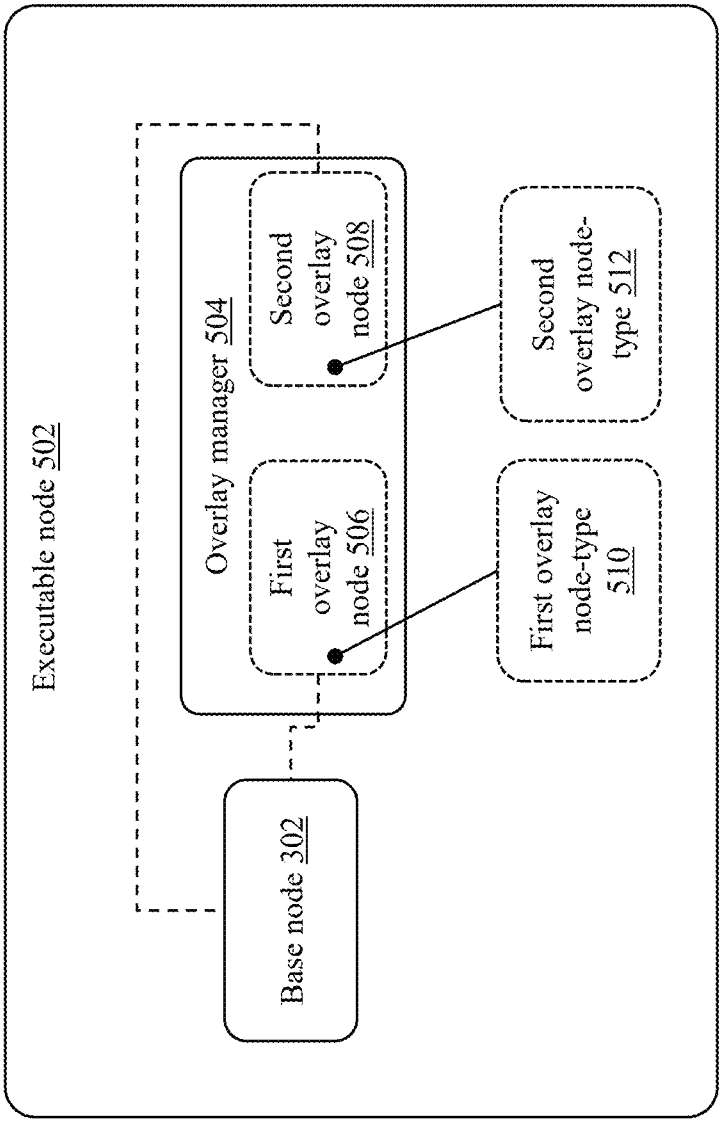
FIG. 5 is a block diagram that illustrates an executable node within the executable graph-based model, consistent with disclosed embodiments of the present disclosure.

FIG. 5 is a block diagram 500 that illustrates an executable node 502 within the executable graph-based model 100, consistent with disclosed embodiments of the present disclosure. Referring to FIG. 5, the executable node 502 is shown to include a base node (e.g., the active node 302) and an overlay manager 504. For the sake of ongoing discussion, the base node corresponds to the active node 302, and is hereinafter referred to as the "base node 302". The base node 302 when extended by way of one or more overlay nodes becomes the executable node 502.

The overlay manager 504 includes a first overlay node 506 and a second overlay node 508. The executable node 502 provides processing functionality (e.g., processing logic) to the base node 302 via one or more associated overlay nodes (for example, the first and second overlay nodes 506 and 508). Beneficially, the data and processing capability of the base node 302 may be dynamically and significantly extended using the concept of an executable node (for example, the executable node 502). As shown, the first overlay node 506 has a first overlay node-type 510, and the second overlay node 508 has a second overlay node-type 512. Examples of overlay node-type include, but are not limited to, an encryption overlay node-type, a publisher overlay node-type, a handler overlay node-type, an obfuscation overlay node-type, or the like.

A node with the encryption overlay node-type is an encryption overlay node that is indicative of an encryption technique using which an associated node is to be secured. The encryption overlay node also includes processing logic to secure a corresponding node. Examples of the encryption technique include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output.

Although, the executable node 502 is shown to include the first and second overlay nodes 506 and 508, in other embodiments, the executable node 502 may include any number of overlay nodes, without deviating from the scope of the present disclosure.

The executable node 502 extends the base node 302 (or is a subtype of the base node 302) such that all the functionality and properties of the base node 302 are accessible to the executable node 502. The executable node 502 also dynamically extends the functionality of the base node 302 by associating the overlay nodes maintained by the overlay manager 504 with the base node 302. The executable node 502 may thus be considered a combination of the base node 302 and the first and second overlay nodes 506 and 508. The executable node 502 may be alternatively referred to as a node with overlay(s). Therefore, the executable node 502 acts as a decorator of the base node 302 adding the functionality of the overlay manager 504 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 504 registers and maintains one or more overlay nodes (such as the first overlay node 506 and the second overlay node 508) associated with the base node 302. The assignment of the first and second overlay nodes 506 and 508 to the base node 302 (via the overlay manager 504) endows the base node 302 with processing logic and executable functionality defined within the first and second overlay nodes 506 and 508.

Extending the functionality of a base node through one or more overlay nodes is at the heart of the overlay system 202. As illustrated in FIG. 2, the data (e.g., a vertex node as represented by the base node 302 in FIG. 5) and the functionality that acts upon that data (e.g., an overlay node) can be separated and independently maintained offline, but at run-time, an association between the data node and the overlay node is determined and an executable node is generated (e.g., the executable node 502 shown in FIG. 5).

It will be apparent to a person skilled in the art that functionalities of the first and second overlay nodes 506 and 508 may be performed by a single overlay node that includes processing logic associated with both the first and second overlay nodes 506 and 508.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 506 or the second overlay node 508, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 504 of the executable node 502 is responsible for executing all overlays registered therewith. The overlay manager 504 also coordinates the execution of all associated overlay nodes. As shown in FIG. 5, the executable node 502 associates the base node 302 with two overlay nodes that is the first overlay node 506 and the second overlay node 508. Thus, the overlay manager 504 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 504 and are associated with an overlay via a node configuration extension for the overlay.

Figure 6:
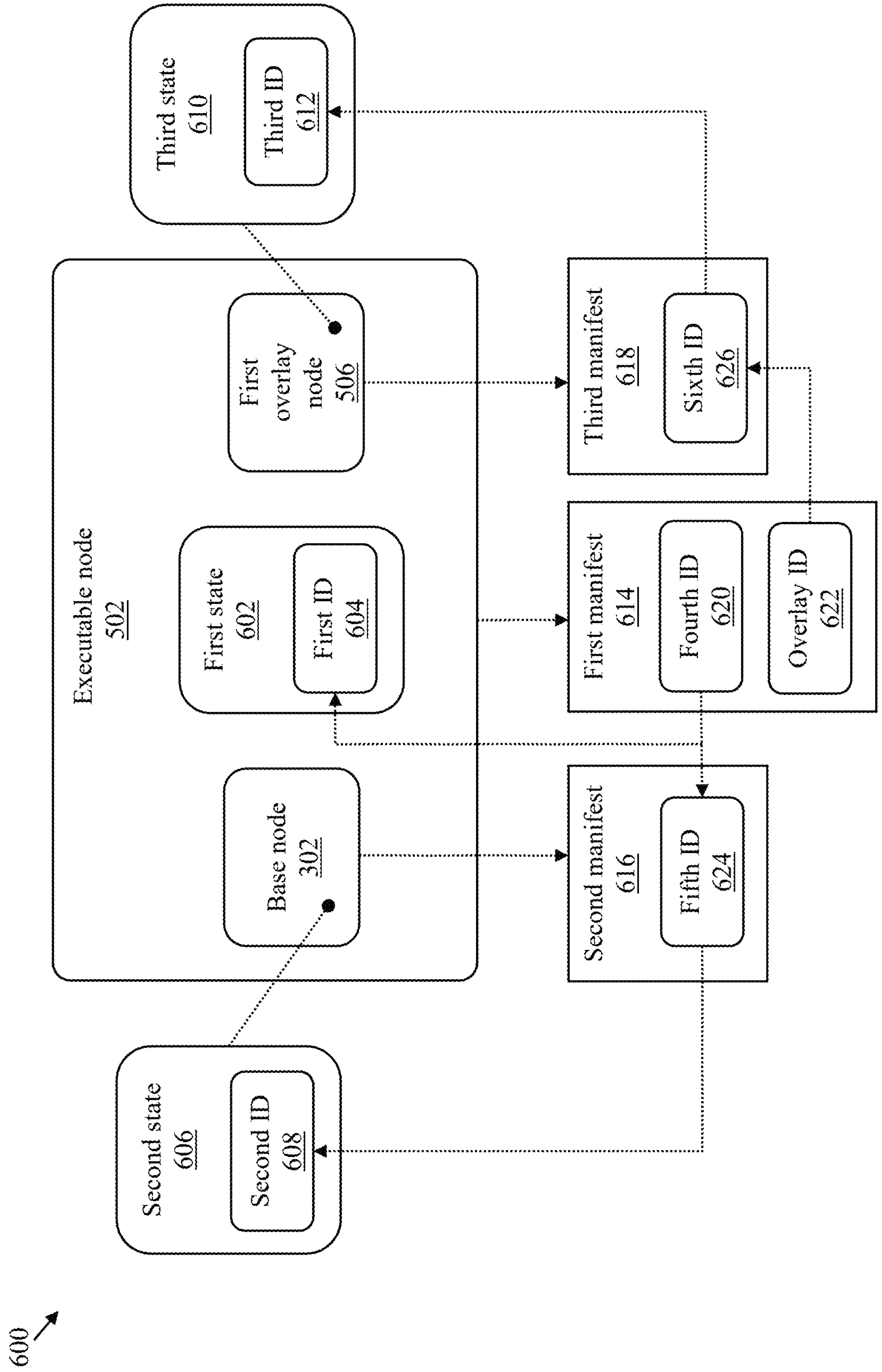
FIG. 6 is a block diagram that illustrates a composition of the executable node that enables persistent storage of data and the processing logic associated therewith, consistent with disclosed embodiments of the present disclosure.

FIG. 6 is a block diagram 600 that illustrates a composition of the executable node 502 that enables persistent storage of data and the processing logic associated therewith, consistent with disclosed embodiments of the present disclosure.

As described in conjunction with FIG. 6, the executable node 502 includes the base node 302 and one or more overlay nodes (e.g., the first and second overlay nodes 506 and 508). For the brevity of the ongoing description, the persistent storage is explained for the executable node 502 including only the first overlay node 506. One or more operations performed for ensuring the persistence of the first overlay node 506 may be performed for the second overlay node 508 as well.

Referring to FIG. 6, the executable node 502 includes the base node 302 and the first overlay node 506. The executable node 502 has a corresponding first state 602 having a first ID 604. The base node 302 has a second state 606 having a second ID 608, and the first overlay node 506 has a third state 610 having a third ID 612. A manifest (for example, first through third manifests 614-618) is generated for each of the base node 302, the executable node 502, and the first overlay node 506. In an embodiment, the manifests may be generated by the storage management module 218. The first manifest 614 is associated with the executable node 502 and has a fourth ID 620 and an overlay ID 622. The second manifest 616 is associated with the base node 302 and has a fifth ID 624. The third manifest 618 is associated with the first overlay node 506 and has a sixth ID 626. Further, the manifests are stored at respective storage locations that may be centralized or distributed storage locations associated with the overlay system 202. The manifests may be stored by the storage management module 218.

The first state 602 of the executable node 502 includes data required to reconstruct the executable node 502 (e.g., attributes, properties, etc.). The first state 602 of the executable node 502 is persistently stored along with the first ID 604. The first manifest 614 is generated for the executable node 502 and has (i) the fourth ID 620 (which is the same as the first ID 604), (ii) the storage location of the first state 602 of the executable node 502, and (iii) the overlay ID 622 (which is the same as the sixth ID 626). Notably, the fourth ID 620 is the same as the first ID 604 and the fifth ID 624, hence, the first manifest 614 includes the ID of the state of the base node 302 and the executable node 502. Further, the overlay ID 622 is the same as the sixth ID 626 of the state of the first overlay node 506. Therefore, the first manifest 614 may be used to identify and retrieve the states of the base node 302, the executable node 502, and the first overlay node 506. Subsequently, the retrieved states may be used to reconstruct the executable node 502 and the first overlay node 506. In an instance, the executable node 502 may be further extended to include additional overlay nodes. In such an instance, the first manifest 614 may include state IDs of the additional overlay nodes as well. A first manifest state (not shown) is then generated for the first manifest 614 and persistently stored along with the fourth ID 620.

The second state 606 of the base node 302 includes data required to reconstruct the base node 302 (e.g., attributes, properties, etc.) and is persistently stored along with the second ID 608. The second manifest 616 is generated for the base node 302 and has the fifth ID 624 and the storage location of the second state 606 of the base node 302. The second ID 608 of the second state 606 and the fifth ID 624 of the second manifest 616 are the same as the first ID 604 of the first state 602 of the executable node 502 (which is also the same as the fourth ID 620 of the first manifest 614 of the executable node 502). As mentioned above, along with the first state 602, the first manifest 614 may also be used to identify and retrieve the second manifest 616 which in turn may be used to identify the second state 606 of the base node 302. A second manifest state (not shown) is then generated for the second manifest 616 and persistently stored along with the fifth ID 624. Thus, the states, manifests, and manifest states for the executable node 502 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 610 of the first overlay node 506 includes data required to reconstruct the first overlay node 506 (e.g., attributes, properties, processing logic, etc.) and is persistently stored along with the third ID 612. The third manifest 618 is generated for the first overlay node 506 and includes the sixth ID 626, which is the same as the third ID 612. Therefore, the first manifest 614 may be further used to identify and retrieve the third manifest 618 which in turn may be used to identify and retrieve the third state 610 of the first overlay node 506. A third manifest state (not shown) is then generated for the third manifest 618 and is persistently stored along with the sixth ID 626.

In operation, when the executable node 502 is to be loaded, the transaction module 208, in conjunction with the storage management module 218, may execute one or more operations to retrieve the first manifest state stored at a known storage location. Based on the first manifest state, the storage management module 218 may re-construct the first manifest 614 which includes the fourth ID 620 which is the same as the fifth ID 624 of the second manifest 616. Based on the fifth ID 624, the storage management module 218 may identify the second manifest state and may generate the second manifest 616 based on which the second state 606 is identified. Subsequently, the base node 302 is loaded and the storage management module 218 may determine that the base node 302 is a node with overlay. Based on the fourth ID 620 (that is the same as the first ID 604 of the first state 602 of the executable node 502) of the first manifest 614, the first state 602 is identified and retrieved. Subsequently, the executable node 502 is loaded. Moreover, based on the overlay ID 622 (that is the same as the sixth ID 626 of the third manifest 618) of the first manifest 614, the third manifest state is identified and the third manifest 618 is generated. Subsequently, based on the sixth ID 626 (that is the same as the third ID of the third state 610) of the third manifest 618, the third state 610 is identified and retrieved. Based on the third state 610, the first overlay node 506 is reconstructed and loaded in the executable graph-based model 100.

Based on a context of a stimulus (for example, the stimulus 238) associated with the overlay system 202, the processing circuitry (such as the context module 210) may determine an ID that is the same as the fifth ID 624. Based on the determined ID, the processing circuitry (such as the memory management module 216 and the storage management module 218) may identify the second manifest 616. Subsequently, the processing circuitry (such as the memory management module 216 and the storage management module 218) may identify the second state 606 which has the second ID 608 that matches the fifth ID 624. Further, the processing circuitry (such as the memory management module 216 and the storage management module 218) may retrieve the second state 606 associated with the second manifest 616 from a corresponding storage element. Subsequently, the processing circuitry (such as the memory management module 216 and the storage management module 218) may determine, by checking the manifest storage(s) associated with the overlay system 202, whether there is another manifest (such as the first manifest 614 of the executable node 502) with an ID that matches the second ID 608 and the fifth ID 624. Notably, the first manifest 614 includes storage locations of each overlay node (for example, the first overlay node 506) of the executable node 502. Based on the overlay ID 622 included in the first manifest 614 that matches the sixth ID 626 included in the third manifest 618, the processing circuitry (such as the memory management module 216 and the storage management module 218) may identify and retrieve the third manifest 618 from a manifest storage of a plurality of manifest storages of the overlay system 202. Subsequently, the processing circuitry (such as the memory management module 216 and the storage management module 218) may identify the third state 610 which has the third ID 612 that matches the sixth ID 626. Further, the processing circuitry (such as the memory management module 216 and the storage management module 218) may retrieve the third state 610 associated with the third manifest 618 from a corresponding storage element. To determine whether the first overlay node 506 has an overlay node associated therewith, the processing circuitry (such as the memory management module 216 and the storage management module 218) may also perform a check to determine whether any of the plurality of manifest storages of the overlay system 202 includes any other manifest with an ID that matches the sixth ID 626. Since the first overlay node 506 does not have an overlay associated therewith, no other manifest has the ID that matches the sixth ID.

Notably, the manifest (the third manifest 618) of the first overlay node 506 includes a reference (such as an identifier that is common to the second manifest 616 and the third manifest 618, a link, a path, a storage location, or the like) to the second manifest 616 of the base node 302. Therefore, the re-formation of the executable node 502 includes re-creation of the first overlay node 506 prior to re-creation of the base node 302. Subsequently, the first overlay node 506 and the base node 302 are organized by associating the base node 302 with the first overlay node 506 to re-form the executable node 502.

In some embodiments, the first overlay node 506 may not be loaded in case it is not required for executing the operation associated with the stimulus 238. The loaded executable node 502 and the first overlay node 506 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 216, the storage management module 218, a combination of these, or any other module of the overlay system 202. Also, all manifest states are stored together at a storage location (such as a manifest storage) that is known to the storage management module 218. Such centralized storage of the manifest states ensures that node states associated therewith are easily accessible.

It will be apparent to a person skilled in the art that although FIG. 6 illustrates only a single overlay node associated with a base node, in other embodiments, the executable node 502 may include additional or different overlay nodes (for example, the second overlay node 508). It will also be apparent to a person skilled in the art that only those overlay nodes that are required for responding to the stimulus 238 may be loaded.

FIGS. 7A-7D, collectively, illustrate graphs 700A-700D that depict a creation of an executable graph-based model using an external file, consistent with disclosed embodiments of the present disclosure.

Figure 7A:
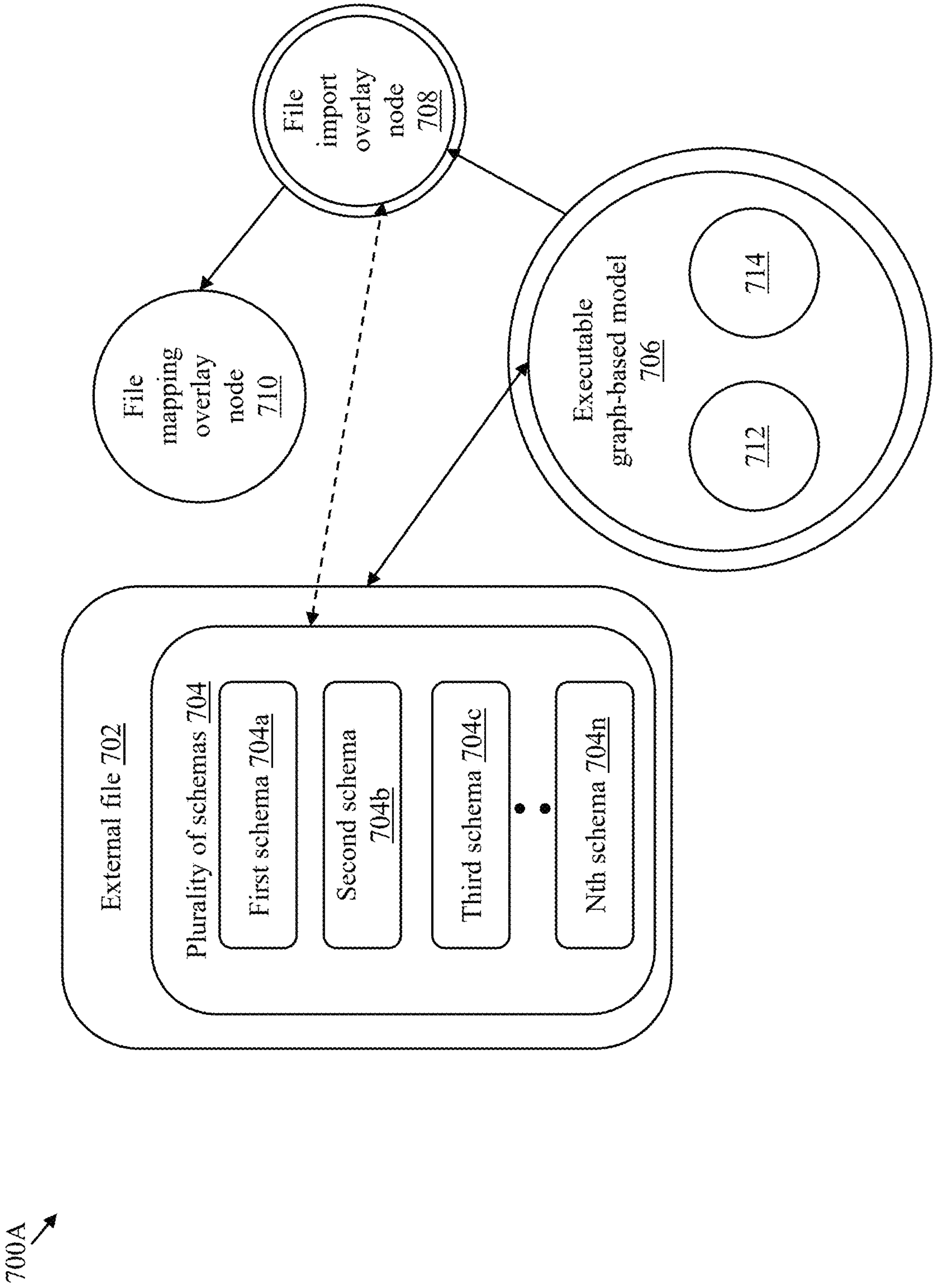
FIGS. 7A-7D, collectively, illustrate graphs that depict a creation of an executable graph-based model using an external file, consistent with disclosed embodiments of the present disclosure.

Referring to FIG. 7A, shown is the graph 700A that includes an external file 702. In an embodiment, the external file 702 may correspond to a data source. In some embodiments, the external file 702 may correspond to an excel file. The excel file is a collection of multiple worksheets. Each worksheet may comprise structural elements such as fields (e.g., columns) and records (e.g., rows). Further, each worksheet may have a corresponding schema associated therewith. The schema of the worksheet may define the data type and constraints associated with the columns (for example, text, integer, float, date, or the like). For example, the excel file may comprise an employee worksheet. Further, the employee worksheet may comprise fields such as 'Employee ID', 'Name', and 'Salary'. The data type and constraints associated with each field may be different. The data type of the 'Employee ID' may be 'integer' with the constraint 'Unique and NOT NULL'. Similarly, the data type of the 'Name' may be 'text' with the constraint 'NOT NULL'. Similarly, the data type of the 'Salary' may be 'float' with the constraint 'MUST BE >0'. Each field may be associated with multiple records such that each record is adhering to the schema associated therewith. That is to say, the rows may contain actual data records that may conform to the defined schema. In the ongoing example, a record (row) adhering to the schema having actual data records may have data values like '101' for the 'Employee ID', 'ABC' for the 'Name', and '50000' for the 'Salary'.

As the excel file comprises multiple worksheets, the data type and constraints associated with the columns in each worksheet may be different. That is to say, each worksheet may have a corresponding schema associated therewith. Therefore, the external file 702 is shown to include a plurality of schemas 704 including a first schema 704*a*, a second schema 704*b*, a third schema 704*c*, . . . , and an nth schema 704*n*. In the ongoing example, the first schema 704*a* may correspond to the schema associated with the employee worksheet, whereas the second through nth schema may correspond to schemas associated with other worksheets included within the excel file that is being represented by the external file 702.

The processing circuitry (for example, the controller module 206, the transaction module 208, the stimuli management module 212, or the like) may be configured to receive a stimulus (for example, the stimulus 238) associated with the overlay system 202. The stimulus may be indicative of a creation of an executable graph-based model to implement the external file 702. The processing circuitry (for example, the controller module 206, the transaction module 208, the stimuli management module 212, the external file management module 222, the storage management module 218, or the like) may be configured to create, based on the stimulus, an executable graph-based model 706 in the storage element. In an embodiment, the executable graph-based model 706 may be structurally and functionally similar to the executable graph-based model 100. The executable graph-based model 706 may be created such that the executable graph-based model 706 implements the external file 702. The processing circuitry (for example, the controller module 206, the transaction module 208, the stimuli management module 212, the external file management module 222, the storage management module 218, or the like) may be configured to create, based on the stimulus, a file import overlay node 708 in the storage element. The file import overlay node 708 may be structurally and functionally similar to the file overlay node 402 with the file import overlay node type 428.

The file import overlay node 708 may be configured to extend the functionality of the executable graph-based model 706. The file import overlay node 708 may be configured to analyze and extend the structural and functional aspects of the external file 702. In an embodiment, the file import overlay node 708 may be configured to determine the plurality of schemas 704 associated with the external file 702.

Further, the processing circuitry (for example, the controller module 206, the transaction module 208, the stimuli management module 212, the external file management module 222, the storage management module 218, or the like) may be configured to create, based on the stimulus, a file mapping overlay node 710 in the storage element. The file mapping overlay node 710 may be structurally and functionally similar to the file overlay node 402 with the file mapping overlay node type 430. The file mapping overlay node 710 may be configured to extend the functionality of the file import overlay node 708.

Throughout the description, a first node configured to extend the functionality of a second node indicates that the first node is an overlay of the second node. This association is not explicitly described for each node to keep the description concise and clear, and should not be considered a limitation of the present disclosure.

The processing circuitry (for example, the controller module 206, the transaction module 208, the stimuli management module 212, the external file management module 222, or the like) may be configured to determine, using the file import overlay node 708, the first schema 704*a* associated with the external file 702. Upon determination of the first schema 704*a*, the processing circuitry (for example, the controller module 206, the transaction module 208, the stimuli management module 212, the external file management module 222, or the like) may be further configured to create, using the file mapping overlay node 710, a node group 712 in the executable graph-based model 706 such that the node group 712 implements the first schema 704*a* in the executable graph-based model 706.

Similarly, the processing circuitry (for example, the controller module 206, the transaction module 208, the stimuli management module 212, the external file management module 222, or the like) may be configured to determine, using the file import overlay node 708, the second through nth schemas associated with the external file 702. Further, the processing circuitry (for example, the controller module 206, the transaction module 208, the stimuli management module 212, the external file management module 222, or the like) may be configured to create a plurality of node groups, using the file mapping overlay node 710, in the executable graph-based model 706, with each node group implementing a corresponding schema associated with the external file 702. That is to say, the processing circuitry (for example, the controller module 206, the transaction module 208, the stimuli management module 212, the external file management module 222, or the like) may be configured to create, using the file mapping overlay node 710, in the executable graph-based model 706, the plurality of node groups (for example, the node group 712 implementing the first schema 704*a* and a node group 714 implementing the second schema 704*b*) that implements the plurality of schemas associated with the external file 702. A node group refers to a data structure that can contain two or more active nodes.

In various embodiments, one or more node groups of the plurality of node groups (for example, the node groups 712 and 714) may be coupled to one or more other node groups in the executable graph-based model 706 based on coupling between one or more schemas of the plurality of schemas 704.

Figure 7B:
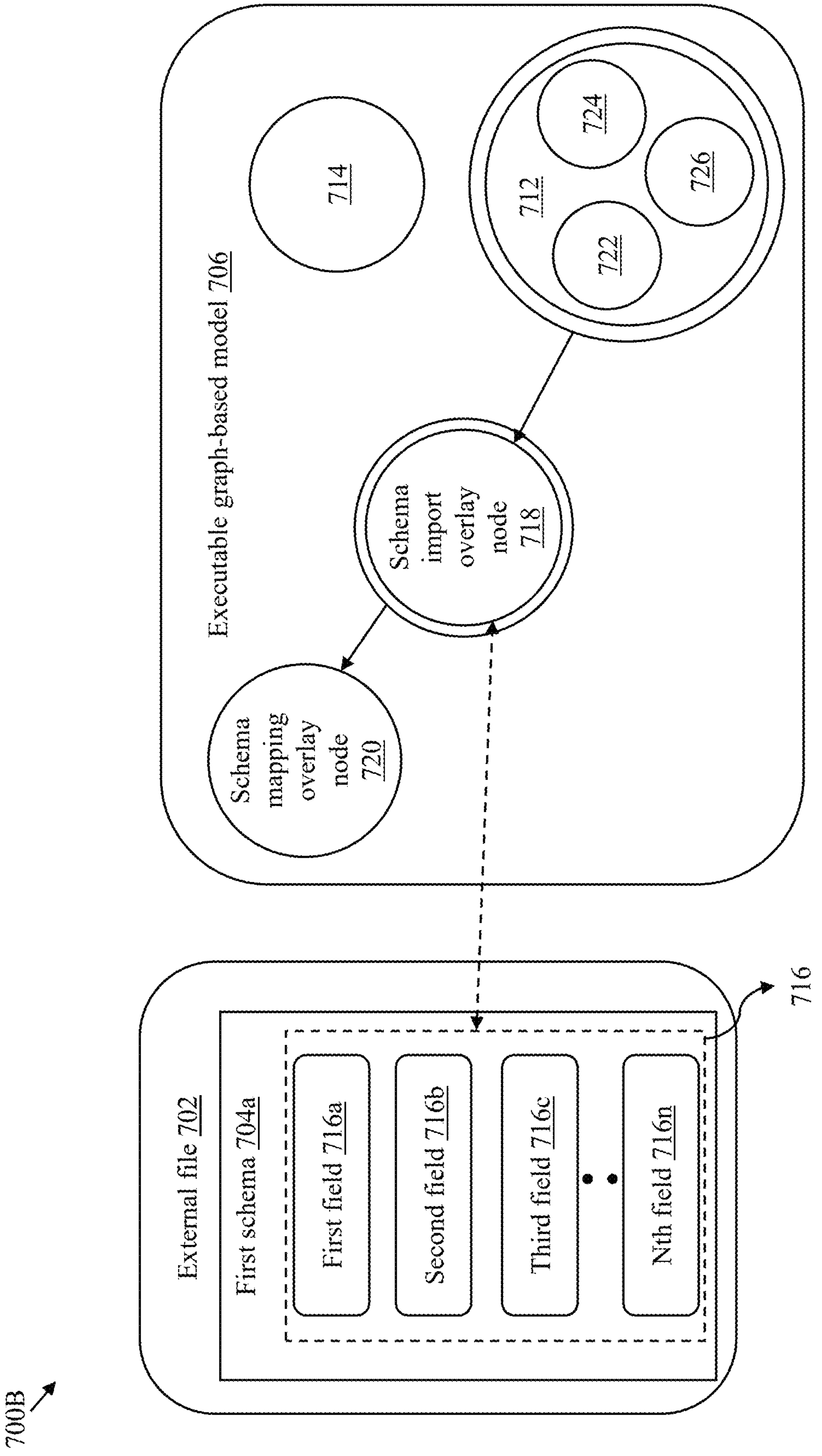

Referring to FIG. 7B, is the graph 700B that illustrates a set of fields 716 including a first field 716*a*, a second field 716*b*, a third field 716*c*, . . . , and an nth field 716*n* associated with the first schema 704*a*. As described above in FIG. 7A, each field of the set of fields 716 may correspond to the column associated with the corresponding schema. In the ongoing discussion, the first field 716*a* may correspond to the 'Employee ID', the second field 716*b* may correspond to the 'Name', and the third field 716*c* may correspond to the 'Salary' comprised within the employee worksheet.

The processing circuitry (for example, the controller module 206, the transaction module 208, the stimuli management module 212, the external file management module 222, or the like) may be further configured to create, in the executable graph-based model 706, a schema import overlay node 718. The schema import overlay node 718 may be configured to extend functionality of the node group 712. The schema import overlay node 718 may be structurally and functionally similar to the file overlay node 402 with the schema import overlay node type 432. Further, the processing circuitry (for example, the controller module 206, the transaction module 208, the external file management module 222, or the like) may be configured to create, in the executable graph-based model 706, a schema mapping overlay node 720. The schema mapping overlay node 720 may be configured to extend the functionality of the schema import overlay node 718. The schema mapping overlay node 720 may be structurally and functionally similar to the file overlay node 402 with the schema mapping overlay node type 434.

The processing circuitry (for example, the controller module 206, the transaction module 208, the external file management module 222, or the like) may be further configured to determine, using the schema import overlay node

718, the first field 716*a* of the set of fields 716. The processing circuitry (for example, the controller module 206, the transaction module 208, the external file management module 222, or the like) may be further configured create, using the schema mapping overlay node 720, an active node 722 in the node group 712 that implements the first field 716*a*.

Similarly, the processing circuitry (for example, the controller module 206, the transaction module 208, the external file management module 222, or the like) may be configured to determine, using the schema import overlay node 718, each field of the set of fields 716, and create, using the schema mapping overlay node 720, a corresponding active node in the node group 712, that implements the determined field. That is to say, the processing circuitry (for example, the controller module 206, the transaction module 208, the external file management module 222, or the like) may be configured to create, in the node group 712, a set of active nodes that implements the set of fields 716 associated with the first schema 704*a*, with a first active node (for example, the active node 722) created for the first field 716*a*.

For the sake of brevity, the node group 712 is only shown to include the active node 722, an active node 724, and an active node 726 that implements the first field 716*a*, the second field 716*b*, and the third field 716*c*, respectively. However, the node group 712 may also include other active nodes implementing the corresponding field of the set of fields 716 in a similar manner. Each active node of the set of active nodes may be structurally and functionally similar to the active node 302. Each active node of the set of active nodes may be one of a group consisting of a vertex node (for example, an active node with the vertex node-type 328), an edge node (for example, an active node with the edge node-type 330), a role node (for example, an active node with the role node-type 334), or an overlay node (for example, an active node with the overlay node-type 332).

Although it is described that the schema import overlay node 718, that extends the functionality of the node group 712, and the schema mapping overlay node 720, that extends the functionality of the schema import overlay node 718, are created in the executable graph-based model 706, the scope of the present disclosure is not limited to it. In various embodiments, the processing circuitry may be configured to create a schema import overlay node for each node group of the plurality of node groups (for example, the node groups 712 and 714) to extend functionality of the corresponding node group in the executable graph-based model 706. In various additional embodiments, the schema import overlay node 718 may extend functionality of each node group of the plurality of node groups (for example, the node groups 712 and 714). In some embodiments, the processing circuitry may be further configured to create a schema mapping overlay node for each created schema import overlay node to extend functionality of the corresponding schema import overlay node. In some more embodiments, the schema mapping overlay node 720 may further extend functionality of each schema import overlay node in the executable graph-based model 706.

Figure 7C:
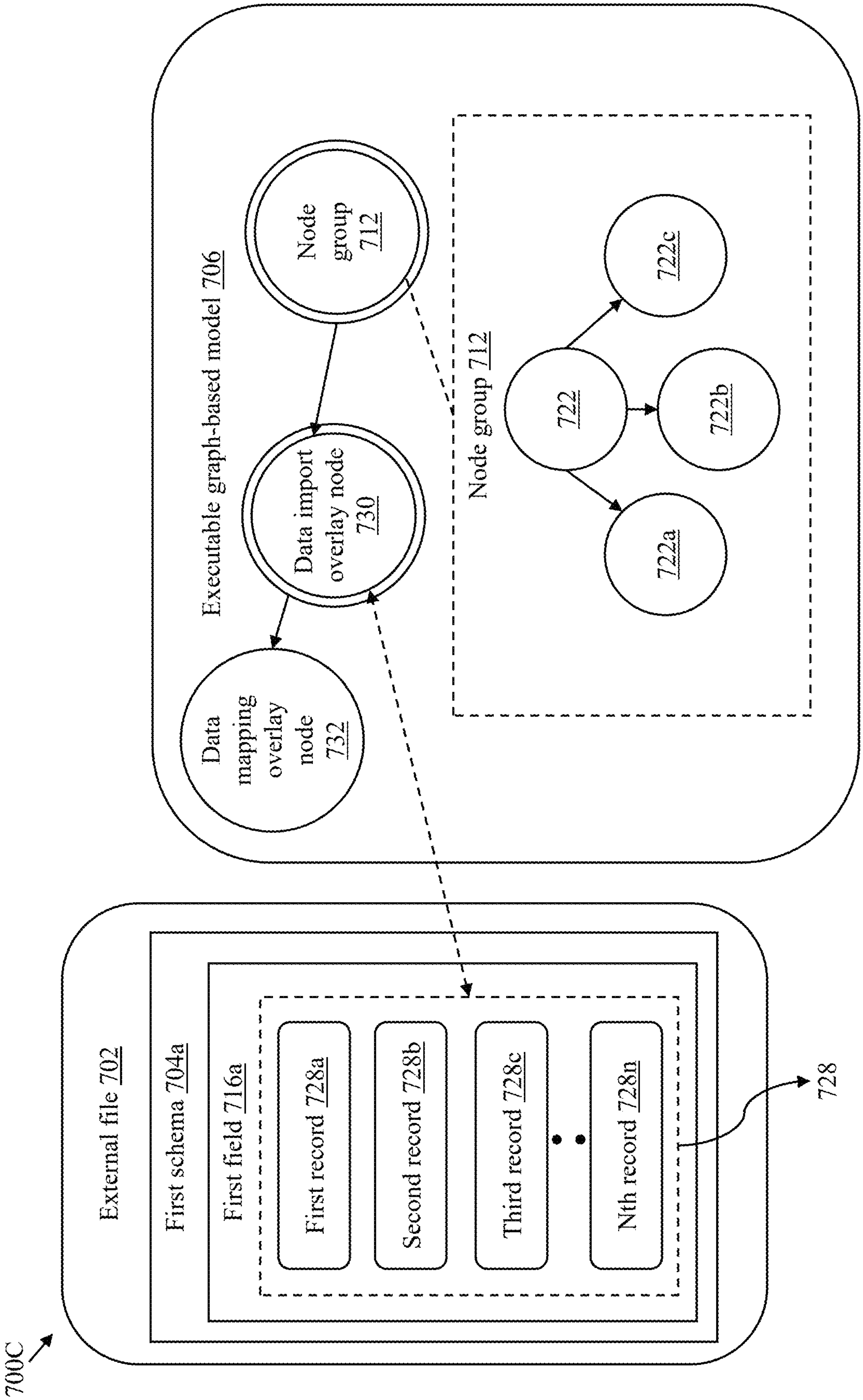

Referring to FIG. 7C, the graph 700C illustrates a set of records 728 including a first record 728*a*, a second record 728*b*, a third record 728*c*, . . . , and an nth record 728*n* associated with the first field 716*a*. As described above, each field of the set of fields 716 may be associated with a set of records. In the ongoing example, the first through nth records associated with the first field 716*a* representing the 'Employee ID' field may correspond to employee IDs associated with the employees that are comprised within the employee's worksheet.

Based on the stimulus, the processing circuitry (for example, the controller module 206, the transaction module 208, the external file management module 222, or the like), may be further configured to create, in the executable graph-based model 706, a data import overlay node 730. The data import overlay node 730 is configured to extend the functionality of the node group 712. The data import overlay node 730 may be structurally and functionally similar to the file overlay node 402 with the data import overlay node type 436. Further, the processing circuitry (for example, the controller module 206, the transaction module 208, the external file management module 222, or the like) may be configured to create, in the executable graph-based model 706, a data mapping overlay node 732. The data mapping overlay node 732 may be structurally and functionally similar to the file overlay node 402 with the data mapping overlay node type 438. The data mapping overlay node 732 is configured to extend the functionality of the data import overlay node 730.

The processing circuitry (for example, the controller module 206, the transaction module 208, the external file management module 222, or the like), based on the stimulus, may be further configured to determine, using the data import overlay node 730, the set of records 728 associated with first field 716*a*. Further, the processing circuitry (for example, the controller module 206, the transaction module 208, the external file management module 222, or the like) may be configured to create, using the data mapping overlay node 732, in the node group 712, a set of active nodes associated with the active node 722. The set of active nodes may implement the set of records 728 associated with the first field 716*a* that is represented by the active node 722.

For the sake of brevity, the node group 712 is shown to include active nodes 722*a*-722*c* that may implement the first through third records 728*a*-728*c*, respectively, associated with the first field 716*a*. In the ongoing discussion, the first through third records 728*a*-728*c* may correspond to employee IDs associated with first through third employees, respectively. However, another set of active nodes may be created in the node group 712 that may be implementing a set of records associated with other fields of the first schema 704*a*. This marks the completion of the creation of the executable graph-based model 706 that implements the external file 702 based on the stimulus.

The executable graph-based model 706 may be utilized for the execution of one or more operations based on the creation thereof. For example, the executable graph-based model 706 may be utilized for determining employee performance analytics, workforce trends, or the like.

Figure 7D:
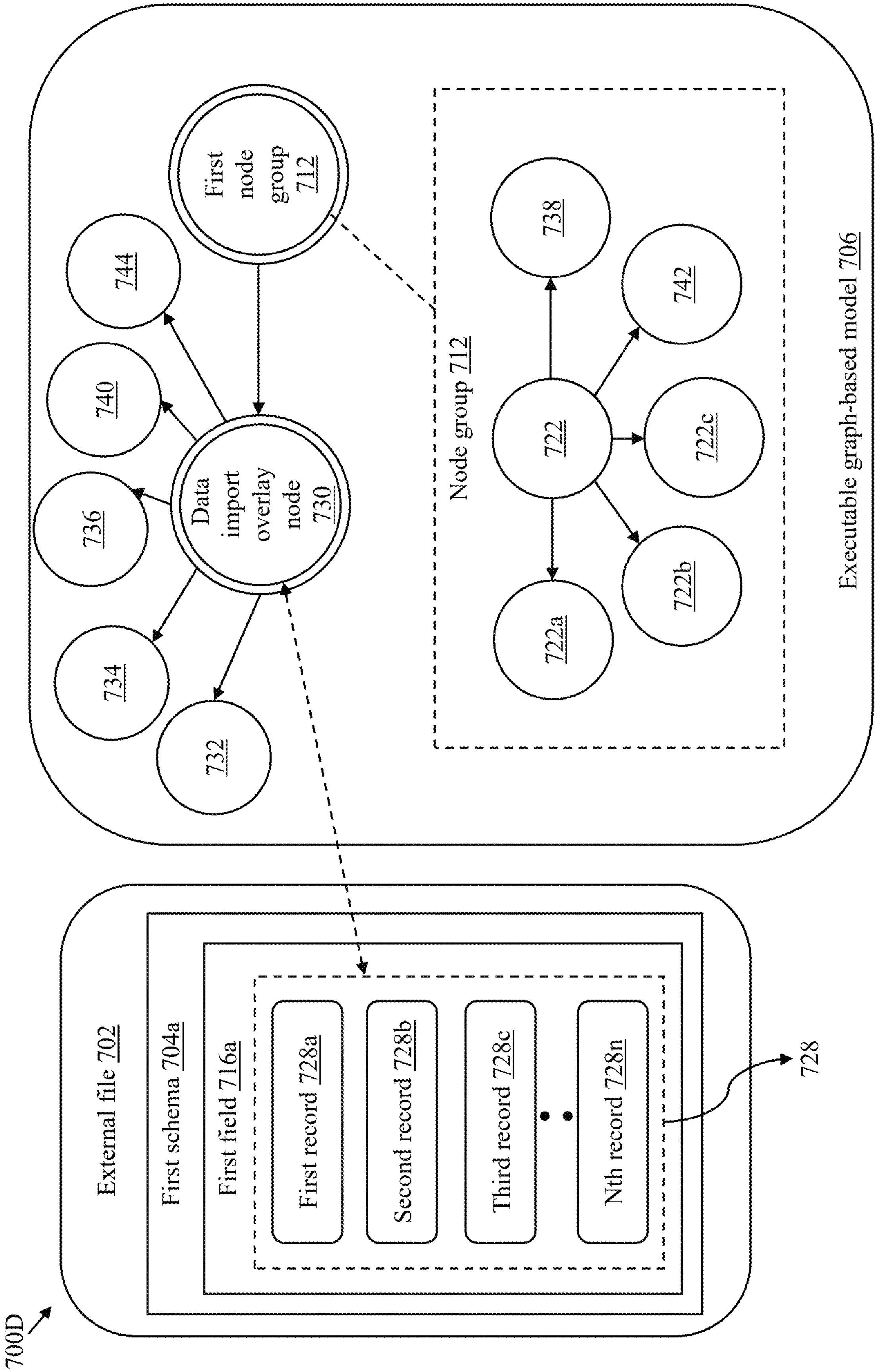

Referring to FIG. 7D, the graph 700D depicts an execution of various operations associated with the executable graph-based model 706. As the executable graph-based model 706 implements the external file 702, any modification associated with the external file 702 may be required to be implemented in the executable graph-based model 706 for the execution of operations associated therewith. The modification in the external file 702 may correspond to an insertion of a new record in the external file 702 that may represent a new employee, updating information associated with the employees, or the like. Thus, to ensure real-time responsiveness and efficient execution of the operations, the processing circuitry (for example, the controller module 206, the transaction module 208, the external file management module 222, or the like) may be further configured to create, in the executable graph-based model 706, a listener overlay node 734 that extends functionality of the data import overlay node 730. The listener overlay node 734 may be further configured to listen for the modifications associated with the external file 702.

In an embodiment, the modification in the external file 702 may be associated with the first schema 704*a*. In such an embodiment, the processing circuitry (for example, the controller module 206, the transaction module 208, the external file management module 222, or the like) may be further configured to monitor, using the listener overlay node 734 and the data import overlay node 730, the first schema 704*a* associated with the external file 702. Further, the processing circuitry (for example, the controller module 206, the transaction module 208, the external file management module 222, or the like) may be configured to update, using the data mapping overlay node 732, the node group 712 that is implementing the first schema 704*a* in the executable graph-based model 706 based on the monitoring of the first schema 704*a*.

In some embodiments, the processing circuitry (for example, the controller module 206, the transaction module 208, the external file management module 222, or the like) may be configured to create, in the executable graph-based model 706, a search overlay node 736 that extends the functionality of the data import overlay node 730. In such embodiments, a user associated with the overlay system 202 may want to know if any new employee record is being added to the employee worksheet at a particular timestamp. In such a scenario, the processing circuitry (for example, the controller module 206, the transaction module 208, the external file management module 222, or the like) may be further configured to search, using the search overlay node 736 and the data import overlay node 730, the first schema 704*a* associated with the external file 702 based on a search value (e.g., the timestamp given by the user). The processing circuitry (for example, the controller module 206, the transaction module 208, the external file management module 222, or the like) may be further configured to retrieve, based on the search, a set of records from the employee worksheet (for example, the first schema 704*a*) that is being added therein at the given timestamp.

Further, the processing circuitry (for example, the controller module 206, the transaction module 208, the external file management module 222, or the like) may be configured to create, using the data mapping overlay node 732, a set of active nodes in the node group 712 that may implement the retrieved set of records. For the sake of brevity, an active node 738 is shown in the node group 712 that may implement an employee ID associated with the newly added employee.

In some embodiments, the processing circuitry (for example, the controller module 206, the transaction module 208, the external file management module 222, or the like) may be further configured to create, in the executable graph-based model 706, a lookup overlay node 740 that extends functionality of the data import overlay node 730. In such embodiments, the processing circuitry (for example, the controller module 206, the transaction module 208, the external file management module 222, or the like) may be configured to lookup, using the lookup overlay node 740 and the data import overlay node 730, the first schema 704*a* based on one or more identifiers associated with the external file 702. In the ongoing discussion, the one or more identifiers may correspond to one or more data values associated with the 'Employee ID'. The processing circuitry (for example, the controller module 206, the transaction module 208, the external file management module 222, or the like) may be further configured to retrieve, based on the lookup, a set of records from the first schema 704*a*. The processing circuitry (for example, the controller module 206, the transaction module 208, the external file management module 222, or the like) may be further configured to create, using the data mapping overlay node 732, a set of active nodes in the node group 712 that implements the retrieved set of records. For the sake of brevity, an active node 742 is shown in the node group 712 that may implement a record of the retrieved set of records associated with the 'Employee ID'.

In some embodiments, the processing circuitry (for example, the controller module 206, the transaction module 208, the external file management module 222, or the like) may be further configured to create, in the executable graph-based model 706, a retrieve-all overlay node 744 that extends functionality of the data import overlay node 730. In such embodiments, the set of active nodes 722*a*-722*c* may be created by the data mapping overlay node 732 based on the retrieval of the first set of records 728 by the processing circuitry (for example, the controller module 206, the transaction module 208, the external file management module 222, or the like) using the data import overlay node 730 and the retrieve-all overlay node 744.

In an embodiment, the executable graph-based model 706 is one of persistable or non-persistable. Based on the executable graph-based model 706 being persistable, the executable graph-based model 706 is stored in the storage element. Further, based on the executable graph-based model 706 being non-persistable, the executable graph-based model 706 ceases to exist from the storage element upon expiration of a threshold time-period.

In some additional embodiments, one or more node groups of the plurality of node groups (for example, the node groups 712 and 714) may be further associated with one or more overlay nodes such as security overlay nodes, encryption overlay nodes, or the like.

FIGS. 8A-8F, collectively, illustrate graphs 800A-800F that depict a creation of a master file using an executable graph-based model, consistent with disclosed embodiments of the present disclosure. For the sake of ongoing discussion, the creation of a master file using the executable graph-based model 706 is described in FIGS. 8A-8F.

Figure 8A:
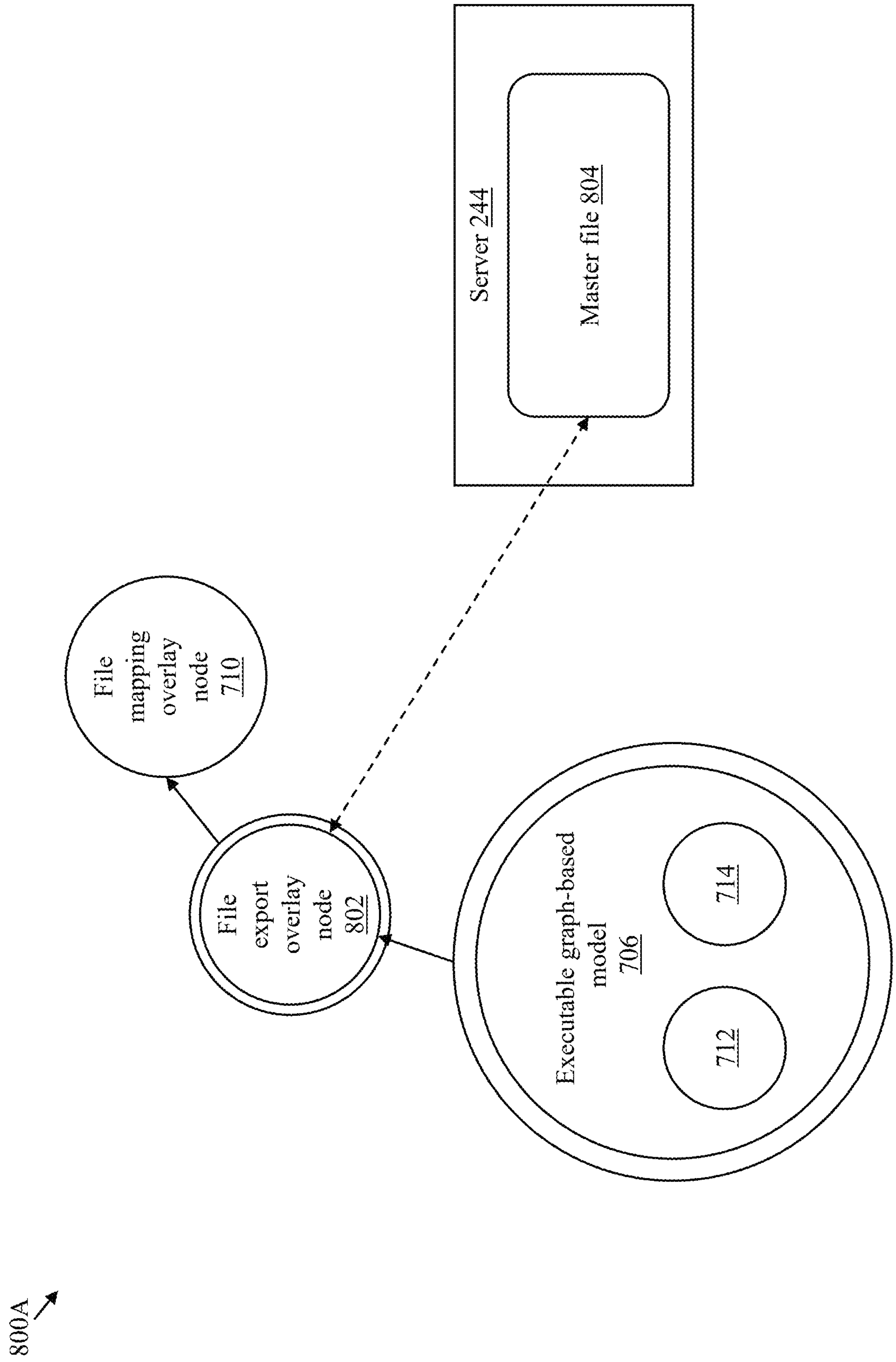
FIGS. 8A-8F, collectively, illustrate graphs that depict a creation of a master file using an executable graph-based model, consistent with disclosed embodiments of the present disclosure.

Referring to FIG. 8A, shown is the executable graph-based model 706. As described previously, the executable graph-based model 706 may include the plurality of node groups including the node groups 712 and 714. Each node group (for example, the node group 712) may include a plurality of active nodes (for example, the active node 722 and the active nodes 722*a*-722*c*). Further, the executable graph-based model 706 is shown to be associated with a file export overlay node 802. In an embodiment, the processing circuitry (e.g., the controller module 206) may be configured to receive a file export overlay node creation stimulus (e.g., the stimulus 238) and create the file export overlay node 802 in response thereof. The file export overlay node 802 may be structurally and functionally similar to the file overlay node 402 with the file export overlay node type 440. The file export overlay node 802 is configured to extend functionality of the executable graph-based model 706. Further, the file export overlay node 802 is shown to be associated with the file mapping overlay node 710. The file mapping overlay node 710 is configured to extend functionality of the file export overlay node 802.

The processing circuitry (for example, the controller module 206, the transaction module 208, the external file management module 222, or the like) is configured to receive a stimulus (for example, the stimulus 238) associated with the overlay system 202. The stimulus may be indicative of a creation of a master file that implements the executable graph-based model 706. In an embodiment, the stimulus may indicate a creation of a master file 804 that implements the executable graph-based model 706 in the server 244. Based on the stimulus, the processing circuitry (for example, the controller module 206, the transaction module 208, the external file management module 222, or the like) may be further configured to create, using the file export overlay node 802 and the file mapping overlay node 710, the master file 804 in the server 244 associated with the overlay system 202. In other words, the file export overlay node 802 and the file mapping overlay node 710 may include processing logic that may enable the creation of the master file 804.

In the ongoing discussion, the executable graph-based model 706 implements the external file 702 that corresponds to the excel file. In some embodiments, the master file 804 that implements the executable graph-based model 706 may also correspond to the excel file. In numerous other embodiments, the master file 804 may correspond to a JSON file, a document file, or the like. That is to say, the executable graph-based model 706 may be transformed into any file based on the requirement associated with the execution of the operation. For the sake of ongoing discussion, the master file 804 is described to be implementing the executable graph-based model 706 as an excel file in conjunction with FIGS. 8A-8F.

Figure 8B:
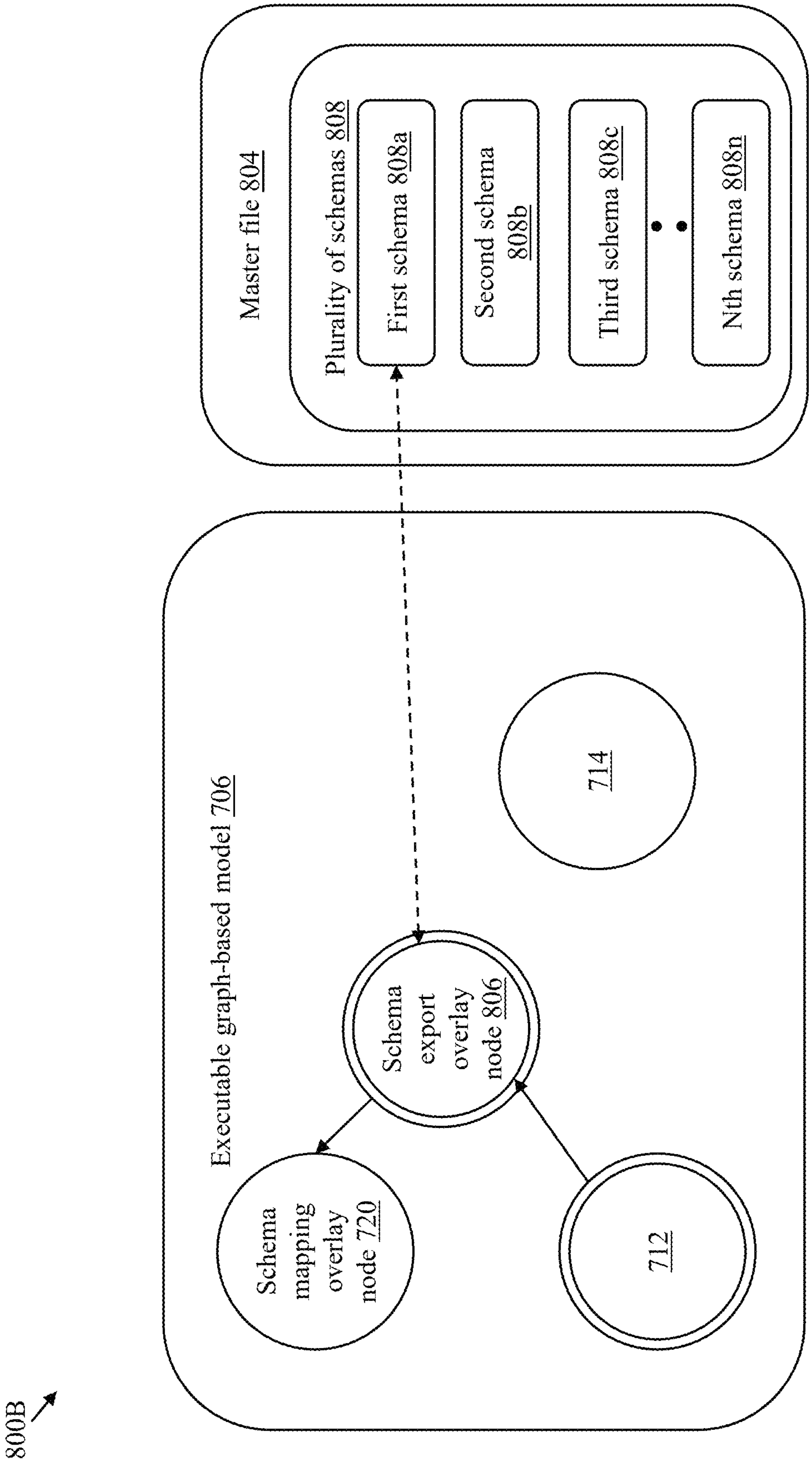

Referring to FIG. 8B, the executable graph-based model 706 is further shown to include a schema export overlay node 806. In an embodiment, the processing circuitry (e.g., the controller module 206) may be configured to receive a schema export overlay node creation stimulus (e.g., the stimulus 238) and create the schema export overlay node 806 in response thereof. The schema export overlay node 806 may be structurally and functionally similar to the file overlay node 402 with the schema export overlay node type 442. The schema export overlay node 806 is configured to extend functionality of the node group 712. Further, the schema export overlay node 806 is shown to be associated with the schema mapping overlay node 720. The schema mapping overlay node 720 is configured to extend functionality of the schema export overlay node 806.

The processing circuitry (for example, the controller module 206, the transaction module 208, the external file management module 222, or the like) may be further configured to determine, using the schema mapping overlay node 720, the node group 712 in the executable graph-based model 706. Further, the processing circuitry (for example, the controller module 206, the transaction module 208, the external file management module 222, or the like) may be configured to create using the schema export overlay node 806, in the master file 804, a plurality of schemas 808 such that a schema is created to implement a node group. For example, the plurality of schemas 808 is shown to include a first schema 808*a*, a second schema 808*b*, a third schema 808*c*, . . . , and an nth schema 808*n*. In the ongoing discussion, the first schema 808*a* is created to implement the node group 712 such that the first schema 808*a* may correspond to the schema associated with the employee worksheet. The second through nth schemas 808*a*-808*n* may be implementing other node groups of the plurality of node groups that are included within the executable graph-based model 706.

Although the schema export overlay node 806 is shown to extend the functionalities of the node group 712, the scope of the present disclosure is not limited to it. In some embodiments, each of the plurality node groups (for example, the node group 712 and 714) may be associated with a dedicated schema export overlay node.

Figure 8C:
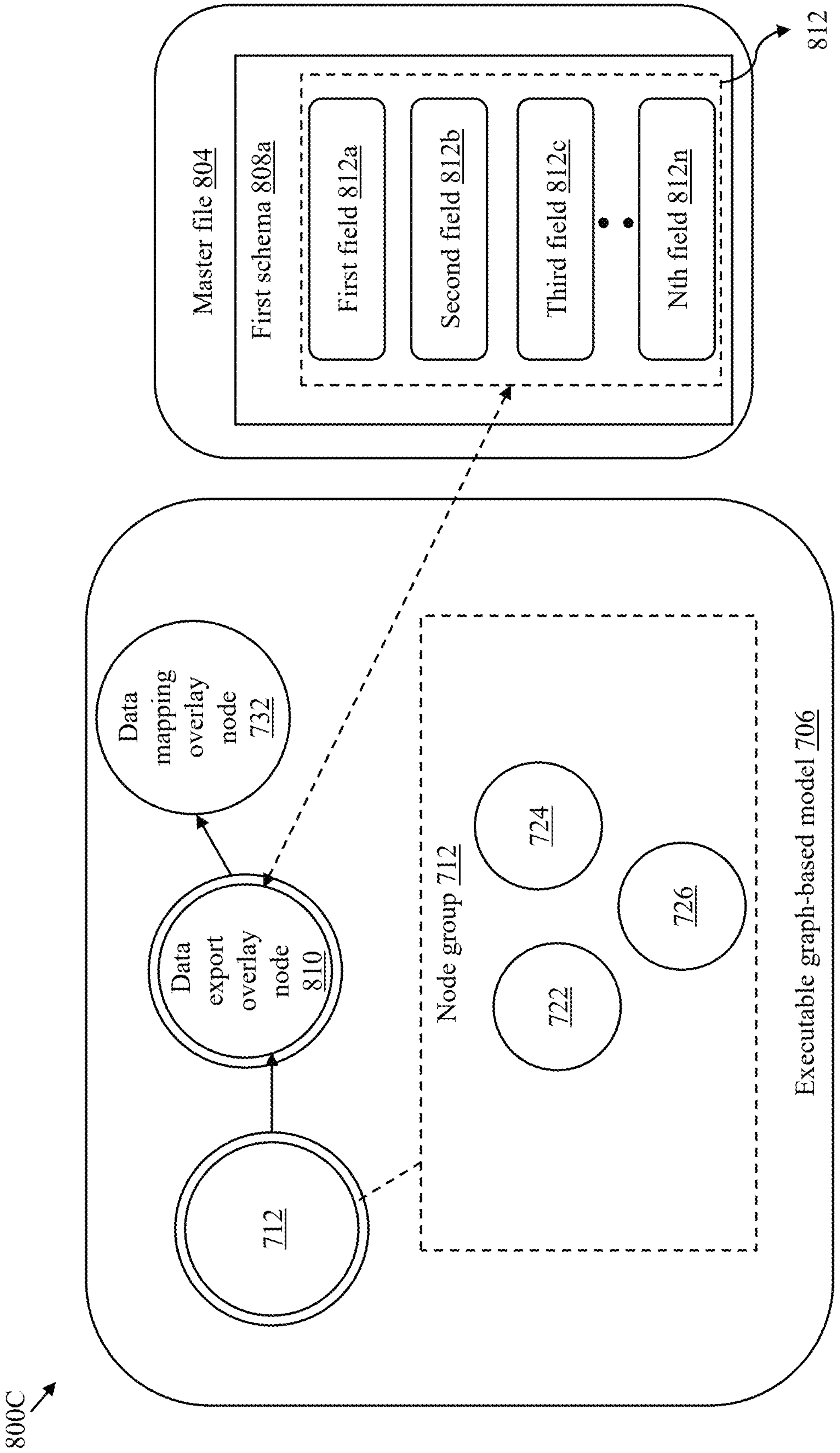

Referring to FIG. 8C, the executable graph-based model 706 is further shown to include a data export overlay node 810. In an embodiment, the processing circuitry (e.g., the controller module 206) may be configured to receive a data export overlay node creation stimulus (e.g., the stimulus 238) and create the data export overlay node 810 in response thereof. The data export overlay node 810 may be structurally and functionally similar to the file overlay node 402 with the data export overlay node type 444. The data export overlay node 810 is configured to extend functionality of the node group 712. Further, the data export overlay node 810 is shown to be associated with the data mapping overlay node 732. The data mapping overlay node 732 is configured to extend functionality of the data export overlay node 810.

The processing circuitry (for example, the controller module 206, the transaction module 208, the external file management module 222, or the like) is further configured to determine, based on the stimulus, using the data mapping overlay node 732, the set of active nodes (for example, the active nodes 722-726) in the node group 712. The processing circuitry (for example, the controller module 206, the transaction module 208, the external file management module 222, or the like) may be further configured to create, using the data export overlay node 810, a set of fields in the first schema 808*a* that implements the determined set of active nodes. For example, the first schema 808*a* is shown to include a set of fields 812. The set of fields 812 is shown to include a first field 812*a*, a second field 812*b*, a third field 812*c*, . . . , and an nth field 812*n*. That is to say, the set of fields 812 that implements the set of active nodes 722-726 is created in the master file 804 such that the first field 812*a* is created for the active node 722 using the data export overlay node 810. In the ongoing discussion, the first field 812*a* may be implementing the ‘Employee ID’, the second field 812*b* may be implementing the ‘Name’, and the third field 812*c* may be implementing the ‘Salary’ in the master file 804.

Although FIG. 8C describes the creation of the set of fields 812 in the first schema 808*a*, the scope of the present disclosure is not limited to it. In various embodiments, a corresponding set of fields may be similarly created in each remaining schema of the plurality of schemas 808.

Figure 8D:
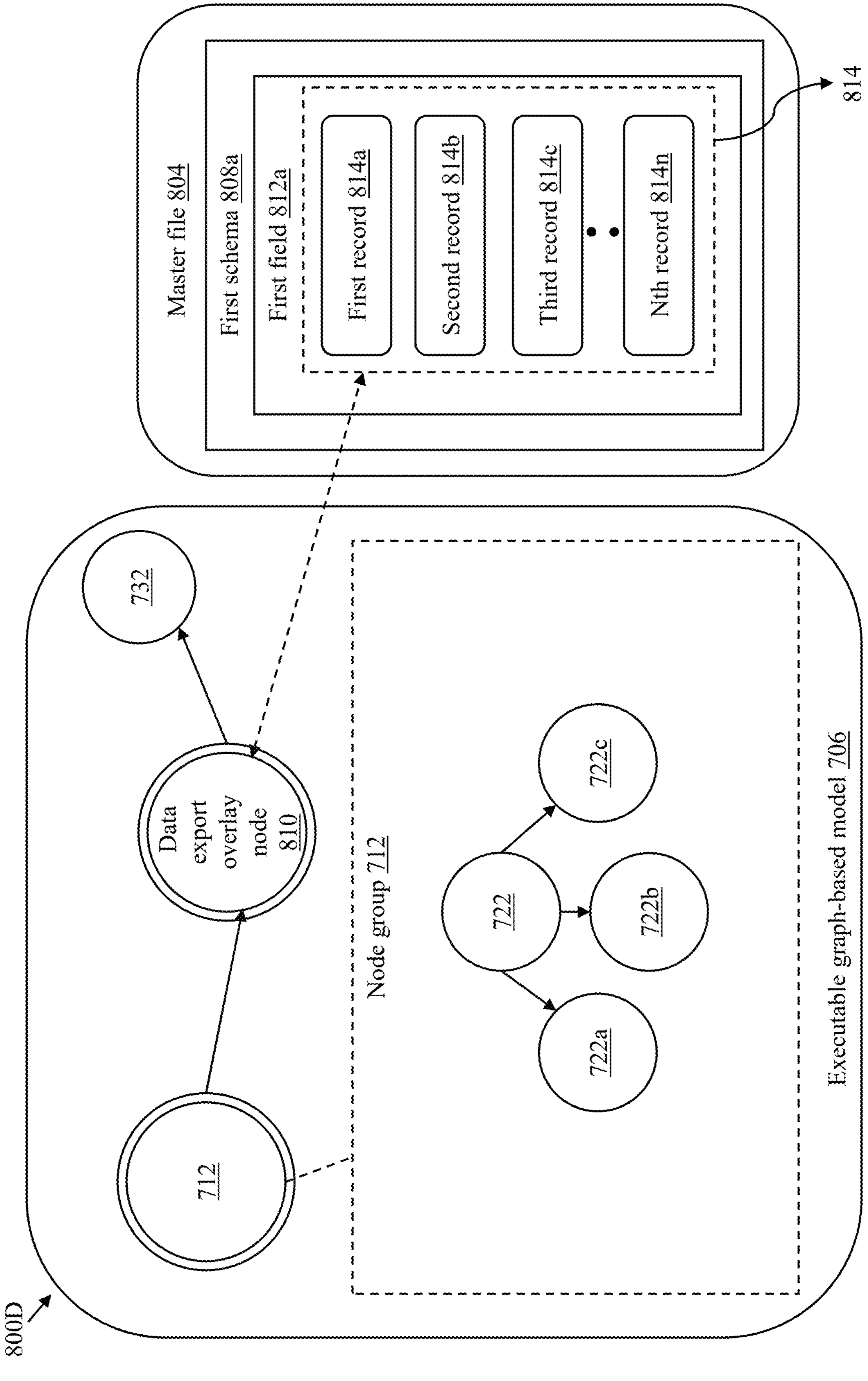

Referring to FIG. 8D, the node group 712 is further shown to include the set of active nodes 722*a*-722*c* that implements the set of records 728 associated with the first field 716*a*. The processing circuitry (for example, the controller module 206, the transaction module 208, the external file management module 222, or the like) may be further configured to determine, using the data mapping overlay node 732, the set of active nodes 722*a*-722*c* associated with the active node 722. Further, the processing circuitry (for example, the controller module 206, the transaction module 208, the external file management module 222, or the like) may be configured to create, using the data export overlay node 810, for the first field 812*a*, a set of records 814 that implements the set of active node 722*a*-722*c* in the master file 804. The set of records 814 may include a first record 814*a*, a second record 814*b*, a third record 814*c*, . . . , and an nth record 814*n* such that the first record 814*a* may be created for the active node 722*a*.

For the sake of brevity, only the set of records 814 associated with the active node 722 is shown in FIG. 8D. However, a set of records for each active node, of the set of active nodes (for example, the active nodes 724 and 726), may be created in the master file 804 in a similar manner. This marks the completion of the creation of the master file 804 that implements the executable graph-based model 706.

Figure 8E:
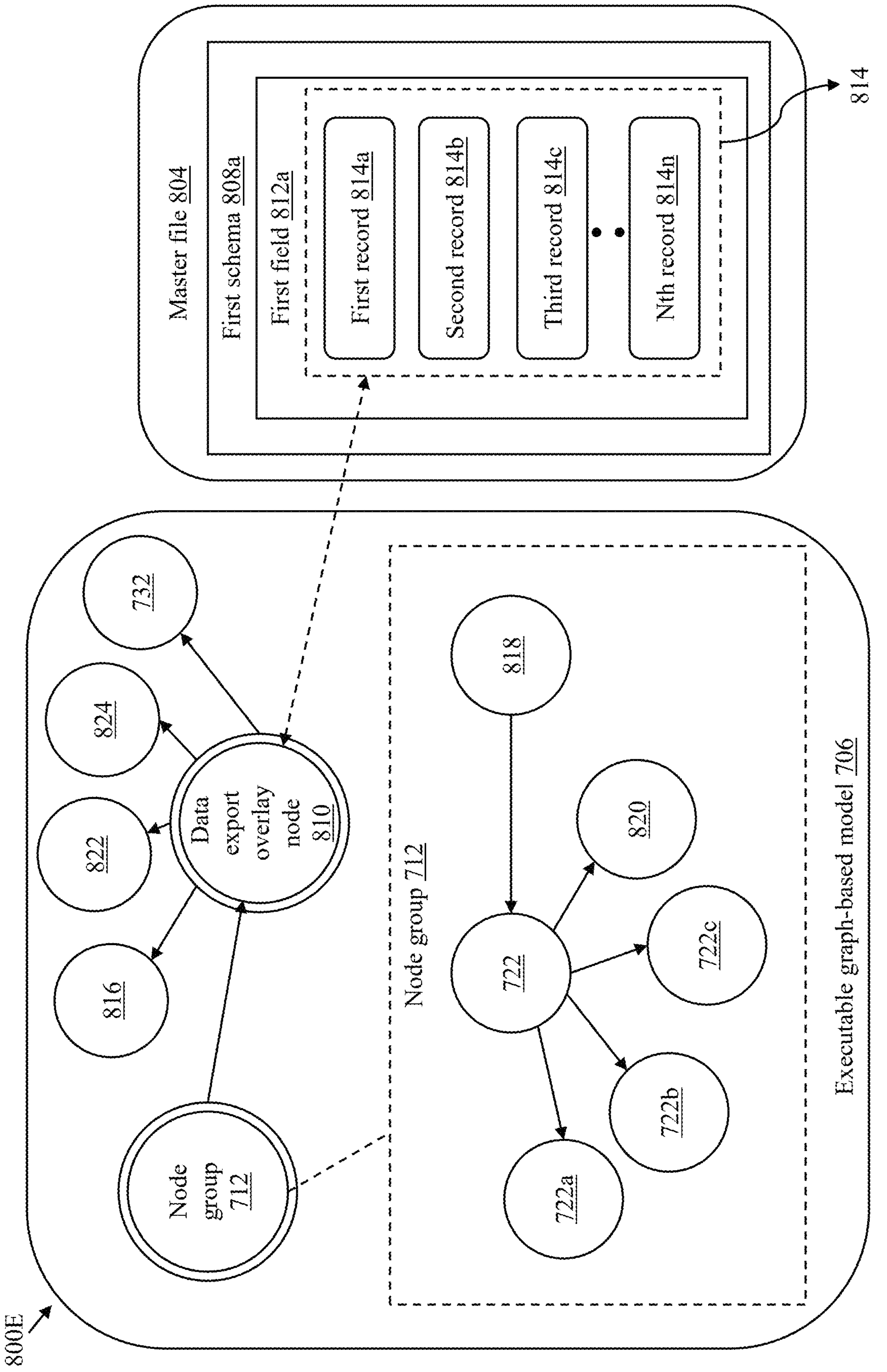

Referring to FIG. 8E, various operations associated with the executable graph-based model 706 are described. In some embodiments, one or more operations may be executed in the executable graph-based model 706.

In some embodiments, the one or more operations may be associated with the set of active nodes that implements the set of fields 716 (for example, the active nodes 722-726) in the node group 712. The one or more operations may correspond to the addition of new attributes, the removal of duplicate data, modifying data values based on criteria, or the like. Execution of such operations may result in modification of the executable graph-based model 706. For example, the addition of the new attributes may result in an addition of a set of active nodes in the node group 712 of the executable graph-based model 706. In some embodiments, the modification of the executable graph-based model 706 may correspond to an update of a subset of active nodes of the node group 712 (for example, one or more active nodes of the active nodes 722-726). In some embodiments, the modification of the executable graph-based model 706 may correspond to a deletion of a subset of active nodes of the node group 712 (for example, one or more active nodes of the active nodes 722-726).

In some embodiments, the one or more operations may be associated with the set of active nodes that implements the set of records associated with the corresponding active node (for example, the active nodes 722*a*-722*c* associated with the active node 722). In such embodiments, the modification of the executable graph-based model 706 may correspond to an addition of a set of active nodes associated with the active node 722. In some embodiments, the modification of the executable graph-based model 706 may correspond to an update of a subset of active nodes associated with the set of active nodes 722-726 (for example, one or more active nodes of the active nodes 722*a*-722*c* associated with the active node 722). In some embodiments, the modification of the executable graph-based model 706 may correspond to a deletion of a subset of active nodes associated with the active node 722 (for example, one or more active nodes of the active nodes 722*a*-722*c* associated with the active node 722).

In such embodiments, the processing circuitry (for example, the controller module 206, the transaction module 208, the external file management module 222, or the like) may be further configured to determine, using the data mapping overlay node 732, a modification of the executable graph-based model 706, and modify the master file 804 based on the modification of the executable graph-based model 706 using the data export overlay node 810. In some embodiments, the processing circuitry (for example, the controller module 206) may be configured to create one or more overlay nodes for facilitating the modification of the master file 804. Examples of such modifications are explained in detail below.

In an example, the modification of the executable graph-based model 706 may correspond to an addition of a first set of active nodes in the node group 712. In such a scenario, the executable graph-based model 706 may include a creation overlay node 816. The creation overlay node 816 is configured to extend the functionality of the data export overlay node 810. In an embodiment, the creation overlay node 816 may be created by the controller module 206 upon reception of a stimulus that indicates the creation of a creation overlay node (for example, the creation overlay node 816). The processing circuitry (for example, the controller module 206, the transaction module 208, the external file management module 222, or the like) may be further configured to identify the first set of active nodes added to the node group 712 using the data mapping overlay node 732. In an embodiment, the processing circuitry (for example, the controller module 206, the transaction module 208, the external file management module 222, or the like) may be configured to identify an active node 818 that is added to the node group 712 in the executable graph-based model 706. In such an embodiment, the active node 818 may correspond to a 'Phone number' to store additional contact details associated with each employee. Further, the processing circuitry (for example, the controller module 206, the transaction module 208, the external file management module 222, or the like) may be configured to create, using the data export overlay node 810 and the creation overlay node 816, a field (not shown) in the first schema 808*a* that implements the identified active node 818 in the first schema 808*a* of the master file 804.

In another example, the modification of the executable graph-based model 706 may correspond to an addition of a second set of active nodes associated with the active node 722. In such a scenario, the processing circuitry (for example, the controller module 206, the transaction module 208, the external file management module 222, or the like) may be configured to identify, using the data mapping overlay node 732, the second set of active nodes associated with the active node 722. In an embodiment, the processing circuitry (for example, the controller module 206, the transaction module 208, the external file management module 222, or the like) may be configured to identify an active node 820 that is added in association with the active node 722. In an embodiment, the active node 820 may correspond to an employee ID of a new employee. Further, the processing circuitry (for example, the controller module 206, the transaction module 208, the external file management module 222, or the like) may be configured to create, using the data export overlay node 810 and the creation overlay node 816, a new record (not shown) associated with the first field 812*a* that implements the active node 820 for the first field 812*a* of the master file 804.

Additions of new active nodes in the executable graph-based model 706 is thus recorded and reflected in the master file 804. The master file 804 may therefore ensure data consistency, accuracy, and reliability for execution of various operations associated therewith.

In yet another example, the modification of the executable graph-based model 706 may correspond to an update of a first subset of active nodes in the node group 712. In such a scenario, the executable graph-based model 706 may include an update overlay node 822. In an embodiment, the update overlay node 822 may be created by the controller module 206 upon reception of a stimulus that indicates the creation of an update overlay node (for example, the update overlay node 822). The update overlay node 822 is configured to extend functionality of the data export overlay node 810. The processing circuitry (for example, the controller module 206, the transaction module 208, the external file management module 222, or the like) may be further configured to identify, using the data mapping overlay node 732, the first subset of active nodes of the set of active nodes (for example, one or more active nodes of the active nodes 722-726) of the node group 712 that is updated. In an embodiment, the active node 722 may be updated such that a format associated with the 'Employee ID' may be changed.

For example, the format of the 'Employee ID' may be updated from a numeric format (e.g., 101, 102, 103, or the like) to an alphanumeric format (e.g., EMP101, EMP102, EMP103, or the like).

Further, to modify the master file 804 based on the modification associated with the active node 722, the processing circuitry (for example, the controller module 206, the transaction module 208, the external file management module 222, or the like) may be configured to identify, using the data mapping overlay node 732, a subset of fields of the set of fields 812 that implements the identified first subset of active nodes. In the ongoing discussion, the processing circuitry (for example, the controller module 206, the transaction module 208, the external file management module 222, or the like) may be configured to identify the first field 812*a* that implements the active node 722. The processing circuitry (for example, the controller module 206, the transaction module 208, the external file management module 222, or the like) may be further configured to update, using the data export overlay node 810 and the update overlay node 822, the first field 812*a*, based on the updated active node 722 of the set of active nodes.

In some embodiments, the update of the subset of fields (for example, the first field 812*a*) of the set of fields (for example, the set of fields 812) is one of periodic or in real-time. For example, the subset of fields may be updated at a scheduled interval (e.g., hourly, daily, weekly, or monthly). The periodic update of the subset of fields may maintain data consistency, thereby reducing the risks of errors. Further, in real-time update of the subset of fields, changes are applied instantly as they occur, ensuring up-to-the-moment accuracy. This may be essential for monitoring systems, financial trading platforms, real-time inventory management, or the like.

In yet another example, the modification of the executable graph-based model 706 may correspond to an update of a second subset of active nodes associated with the active node 722. In such a scenario, the processing circuitry (for example, the controller module 206, the transaction module 208, the external file management module 222, or the like) may be configured to identify, using the data mapping overlay node 732, the second subset of active nodes (for example, one or more active nodes of the active nodes 722*a*-722*c*) associated with the active node 722 that is updated. In an embodiment, the active node 722*a* may be updated such that the data value associated with the 'Employee ID' may be changed. Further, to modify the master file 804 based on the modification associated with the active node 722*a*, the processing circuitry (for example, the controller module 206, the transaction module 208, the external file management module 222, or the like) may be configured to identify, using the data mapping overlay node 732, from the set of records 814, a subset of records that implements the set of active nodes 722*a*-722*c* in the master file 804. In the ongoing discussion, the processing circuitry (for example, the controller module 206, the transaction module 208, the external file management module 222, or the like) may be configured to identify the first record 814*a* that implements the active node 722*a*. The processing circuitry (for example, the controller module 206, the transaction module 208, the external file management module 222, or the like) may be further configured to update, using the data export overlay node 810 and the update overlay node 822, the first record 814*a*, of the set of records 814, based on the updated active node 722*a* of the set of active nodes. In some embodiments, the update of the subset of records (for example, the first record 814*a*), of the set of records (for example, the set of records 814) is one of periodic or in real-time.

Updates associated with active nodes in the executable graph-based model 706 are thus recorded and reflected in the master file 804. The updated master file 804 may ensure enhanced data accuracy. That is to say, the updated master file 804 may reduce errors or redundancies that may have been caused by outdated data. The updated master file 804 may be useful in AI-driven systems, where up-to-date and relevant data is crucial for enhancing predictive analytics, trend analysis, and machine learning accuracy.

In yet another example, the modification of the executable graph-based model 706 may correspond to a deletion of a first subset of active nodes of the set of active nodes (for example, the active nodes 722-726) of the node group 712. In such a scenario, the executable graph-based model 706 may include a delete overlay node 824. In an embodiment, the delete overlay node 824 may be created by the controller module 206 upon reception of a stimulus that indicates the creation of a delete overlay node (for example, the delete overlay node 824). The delete overlay node 824 is configured to extend functionality of the data export overlay node 810. The processing circuitry (for example, the controller module 206, the transaction module 208, the external file management module 222, or the like) may be further configured to identify, using the data mapping overlay node 732, the first subset of active nodes of the set of active nodes (for example, one or more active nodes of the active nodes 722-726) of the node group 712 that is deleted from the executable graph-based model 706. In an embodiment, the processing circuitry (for example, the controller module 206, the transaction module 208, the external file management module 222, or the like) may identify that the active node 724 is deleted from the executable graph-based model 706. Further, the processing circuitry (for example, the controller module 206, the transaction module 208, the external file management module 222, or the like) may be configured to identify, using the data mapping overlay node 732, from the set of fields 812, a subset of fields that implements the identified first subset of active nodes (for example, the active node 724). In an embodiment, the processing circuitry (for example, the controller module 206, the transaction module 208, the external file management module 222, or the like) may identify, using the data mapping overlay node 732, the second field 812*b* that implements the active node 724 in the master file 804. The processing circuitry (for example, the controller module 206, the transaction module 208, the external file management module 222, or the like) may be further configured to delete, using the data export overlay node 810 and the delete overlay node 824, the subset of the fields (for example, the second field 812*b*), based on the deleted subset of active nodes (for example, the active node 724) of the set of active nodes.

In yet another example, the modification of the executable graph-based model 706 may correspond to a deletion of a second subset of active nodes of the set of active nodes (for example, one or more active nodes of the active nodes 722*a*-722*c*). In such a scenario, the processing circuitry (for example, the controller module 206, the transaction module 208, the external file management module 222, or the like) may be configured to identify, using the data mapping overlay node 732 the second subset of active nodes (for example, one or more active nodes of the active nodes 722*a*-722*c*) associated with the active node 722 that is deleted. In an embodiment, the processing circuitry (for example, the controller module 206, the transaction module 208, the external file management module 222, or the like) may identify that the active node 722*a* is deleted from the executable graph-based model 706. The processing circuitry (for example, the controller module 206, the transaction module 208, the external file management module 222, or the like) may be further configured to identify, using the data mapping overlay node 732, from the set of records 814, a subset of records that implements the second subset of active nodes. In an embodiment, the processing circuitry may identify that the active node 722*a* is implemented by the first record 814*a* in the master file 804. In such an embodiment, the processing circuitry (for example, the controller module 206, the transaction module 208, the external file management module 222, or the like) may be further configured to delete, using the data export overlay node 810 and the delete overlay node 824, the subset of records (for example, first record 814*a*), of the set of records 814, based on the deleted subset of active nodes (for example, the active node 722*a*) of the set of active nodes.

Thus, based on the modification of the executable graph-based model 706 the processing circuitry (for example, the controller module 206, the transaction module 208, the external file management module 222, or the like) is configured to modify the master file 804.

FIGS. 8A-8E illustrate the executable graph-based model 706 as a non-template graph. However, the scope of the present disclosure is not limited to it. In several embodiments, the executable graph-based model 706 may correspond to a run-time model. The creation of the master file 804 to implement such a run-time model is illustrated in FIG. 8F.

Figure 8F:
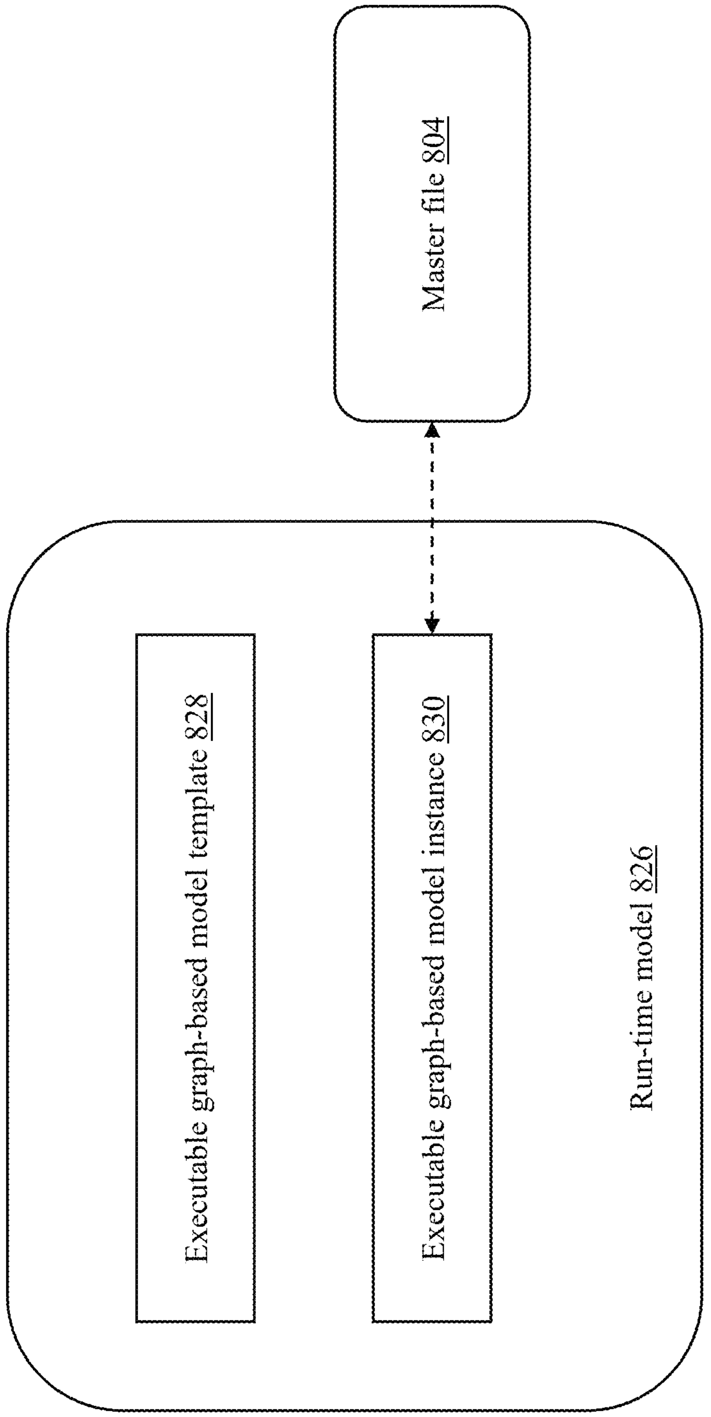

Referring to FIG. 8F, the executable graph-based model 706 is shown to be a run-time model 826. The run-time model 826 includes an executable graph-based model template 828 and an executable graph-based model instance 830. The executable graph-based model template 828 defines a graph structure, whereas the executable graph-based model instance 830 is an implementation of the executable graph-based model template 828. In an embodiment, the master file 804 created by the processing circuitry (for example, the controller module 206, the transaction module 208, the external file management module 222, or the like) implements the executable graph-based model instance 830 in the server 244 associated with the overlay system 202.

Figure 9:
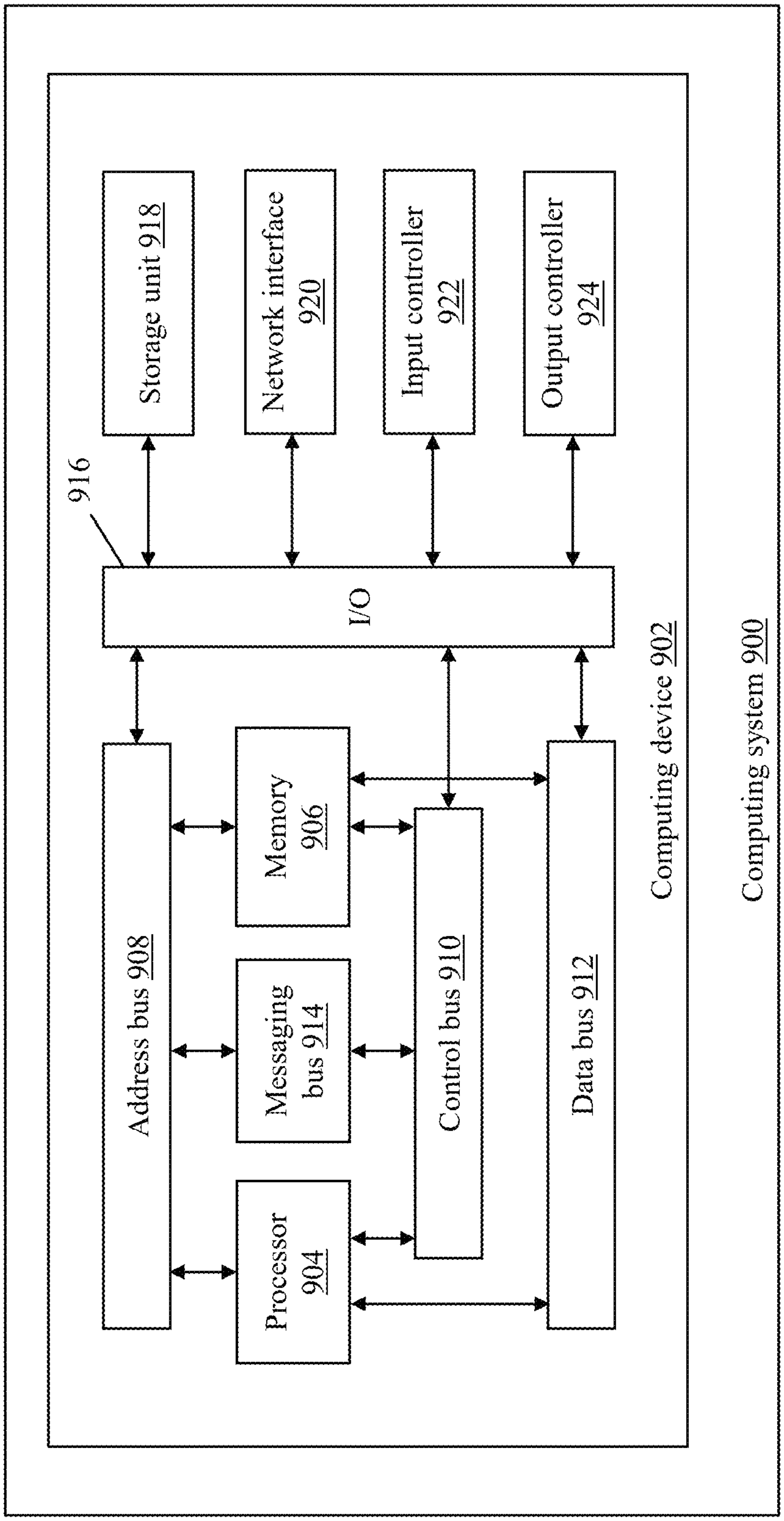
FIG. 9 shows an example computing system for carrying out methods of the present disclosure, consistent with disclosed embodiments of the present disclosure.

FIG. 9 shows an example computing system 900 for carrying out methods of the present disclosure, consistent with disclosed embodiments of the present disclosure. Specifically, FIG. 9 shows a block diagram of an embodiment of the computing system 900 according to example embodiments of the present disclosure.

The computing system 900 may be configured to perform any of the operations disclosed herein, for example, any of the operations discussed with reference to the functional modules described in relation to FIG. 2. The computing system 900 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 900 is a distributed system configured to function using multiple computing machines interconnected via a data network or bus system.

The computing system 900 includes computing devices (such as a computing device 902). The computing device 902 includes one or more processors (such as a processor 904) and a memory 906. The processor 904 may be any general-purpose processor(s) configured to execute a set of instructions. For example, the processor 904 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 904 may be multiple processing units, a single processing core, multiple processing cores, special purpose processing cores, co-processors, or any combination thereof. The processor 904 may be communicatively coupled to the memory 906 via an address bus 908, a control bus 910, a data bus 912, and a messaging bus 914.

The memory 906 may include non-volatile memories such as a read-only memory (ROM), a programable read-only memory (PROM), an erasable programmable read-only memory (EPROM), a flash memory, or any other device capable of storing program instructions or data with or without applied power. The memory 906 may also include volatile memories, such as a random-access memory (RAM), a static random-access memory (SRAM), a dynamic random-access memory (DRAM), and a synchronous dynamic random-access memory (SDRAM). The memory 906 may include single or multiple memory modules. While the memory 906 is depicted as part of the computing device 902, a person skilled in the art will recognize that the memory 906 can be separate from the computing device 902.

The memory 906 may store information that can be accessed by the processor 904. For instance, the memory 906 (e.g., one or more non-transitory computer-readable storage mediums, memory devices) may include computer-readable instructions (not shown) that can be executed by the processor 904. The computer-readable instructions may be software written in any suitable programming language or may be implemented in hardware. Additionally, or alternatively, the computer-readable instructions may be executed in logically and/or virtually separate threads on the processor 904. For example, the memory 906 may store instructions (not shown) that when executed by the processor 904 cause the processor 904 to perform operations such as any of the operations and functions for which the computing system 900 is configured, as described herein. Additionally, or alternatively, the memory 906 may store data (not shown) that can be obtained, received, accessed, written, manipulated, created, and/or stored. The data can include, for instance, the data and/or information described herein in relation to FIGS. 1-8. In some implementations, the computing device 902 may obtain from and/or store data in one or more memory device(s) that are remote from the computing system 900.

The computing device 902 may further include an input/output (I/O) interface 916 communicatively coupled to the address bus 908, the control bus 910, and the data bus 912. The data bus 912 and messaging bus 914 may include a plurality of tunnels that may support parallel execution of messages by the overlay system 202. The I/O interface 916 is configured to couple to one or more external devices (e.g., to receive and send data from/to one or more external devices). Such external devices, along with the various internal devices, may also be known as peripheral devices. The I/O interface 916 may include both electrical and physical connections for operably coupling the various peripheral devices to the computing device 902. The I/O interface 916 may be configured to communicate data, addresses, and control signals between the peripheral devices and the computing device 902. The I/O interface 916 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 916 is configured to implement only one interface or bus technology. Alternatively, the I/O interface 916 is configured to implement multiple interfaces or bus technologies. The I/O interface 916 may include one or more buffers for buffering transmissions between one or more external devices, internal devices, the computing device 902, or the processor 904. The I/O interface 916 may couple the computing device 902 to various input devices, including mice, touch screens, scanners, biometric readers, electronic digitizers, sensors, receivers, touchpads, trackballs, cameras, microphones, keyboards, any other pointing devices, or any combinations thereof. The I/O interface 916 may couple the computing device 902 to various output devices, including video displays, speakers, printers, projectors, tactile feedback devices, automation control, robotic components, actuators, motors, fans, solenoids, valves, pumps, transmitters, signal emitters, lights, and so forth.

The computing system 900 may further include a storage unit 918, a network interface 920, an input controller 922, and an output controller 924. The storage unit 918, the network interface 920, the input controller 922, and the output controller 924 are communicatively coupled to the central control unit (e.g., the memory 906, the address bus 908, the control bus 910, and the data bus 912) via the I/O interface 916. The network interface 920 communicatively couples the computing system 900 to one or more networks such as wide area networks (WAN), local area networks (LAN), intranets, the Internet, wireless access networks, wired networks, mobile networks, telephone networks, optical networks, or combinations thereof. The network interface 920 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 918 is a computer-readable medium, preferably a non-transitory computer-readable medium, comprising one or more programs, the one or more programs comprising instructions which when executed by the processor 904 cause the computing system 900 to perform the method steps of the present disclosure. Alternatively, the storage unit 918 is a transitory computer-readable medium. The storage unit 918 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 918 stores one or more operating systems, application programs, program modules, data, or any other information. The storage unit 918 is part of the computing device 902. Alternatively, the storage unit 918 is part of one or more other computing machines that are in communication with the computing device 902, such as servers, database servers, cloud storage, network attached storage, and so forth.

The input controller 922 may include suitable logic, circuitry, interfaces, and/or code, executable by the circuitry, that may be configured to control one or more input devices that may be configured to receive an input (e.g., the stimulus 238) for the overlay system 202. The output controller 924 may include suitable logic, circuitry, interfaces, and/or code, executable by the circuitry, that may be configured to control one or more output devices that may be configured to render/output the outcome (e.g., the outcome 242) of the operation executed to process the received input (e.g., the stimulus 238).

Figure 10:
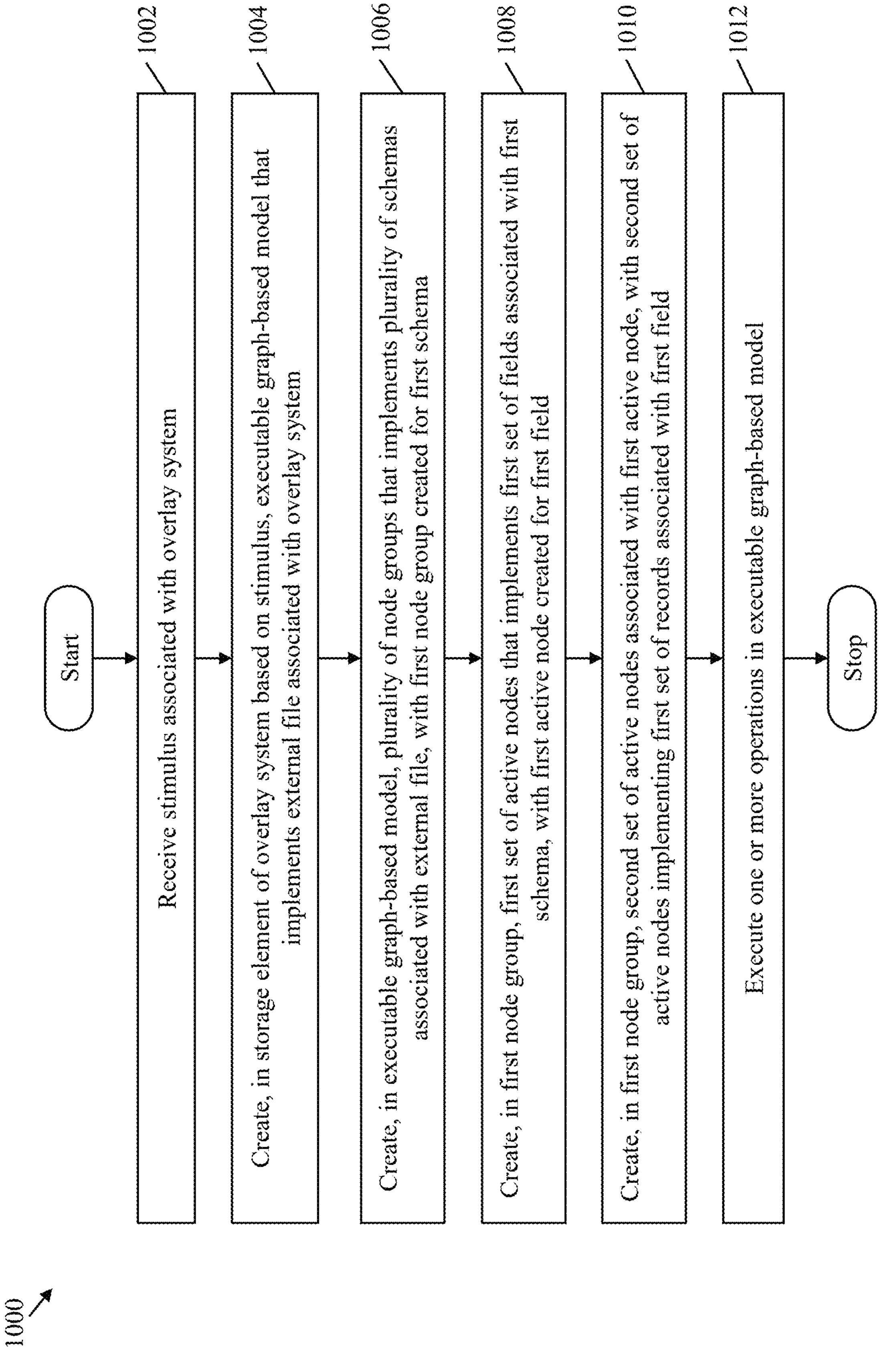
FIG. 10 illustrates a flowchart of a method for the creation of an executable graph-based model that implements an external file, consistent with disclosed embodiments of the present disclosure.

FIG. 10 illustrates a flowchart 1000 of a method for the creation of an executable graph-based model that implements an external file, consistent with disclosed embodiments of the present disclosure. Referring to FIG. 10, at 1002, a stimulus associated with an overlay system is received. The processing circuitry (such as the controller module 206 and the stimuli management module 212) receives the stimulus (for example, the stimulus 238) associated with the overlay system (for example, the overlay system 202). The stimulus is indicative of a creation of an executable graph-based model (for example, the executable graph-based model 706) that implements an external file (for example, the external file 702).

At 1004, the executable graph-based model that implements the external file associated with the overlay system is created in a storage element of the overlay system based on the stimulus. The processing circuitry (such as the controller module 206, the context module 210, and the external file management module 222) creates the executable graph-based model in the storage element.

At 1006, in the executable graph-based model, a plurality of node groups that implements a plurality of schemas associated with the external file is created, with a first node group created for a first schema. The processing circuitry (such as the controller module 206, the context module 210, and external file management module 222) creates, in the executable graph-based model, the plurality of node groups (for example, the node groups 712 and 714) that implements the plurality of schemas (for example, the plurality of schemas 704) associated with the external file, with a first node group (for example, the node group 712) created for a first schema (for example, the first schema **704*a***).

At 1008, in the first node group, a first set of active nodes that implements a first set of fields associated with the first schema is created, with a first active node created for a first field. The processing circuitry (such as the controller module 206, the context module 210, and external file management module 222) creates, in the first node group, the first set of active nodes (for example, the active nodes 722-726) that implements the first set of fields (for example, the set of fields 716) associated with the first schema, with the first active node (for example, the active node 722) created for the first field (for example, the first field **716*a***).

At 1010, in the first node group, a second set of active nodes associated with the first active node, with a second set of active nodes implementing a first set of records associated with the first field is created. The processing circuitry (such as the controller module 206, the context module 210, and external file management module 222) creates, in the first node group, a second set of active nodes (for example, the set of active nodes 722*a*-722*c*) associated with the first active node (for example, the active node 722), with the second set of active nodes implementing the first set of records (for example, the set of records 728) associated with the first field.

At 1012, one or more operations in the executable graph-based model are executed. The processing circuitry (such as the controller module 206, the context module 210, and the external file management module 222) executes the one or more operations in the executable graph-based model.

Figure 11:
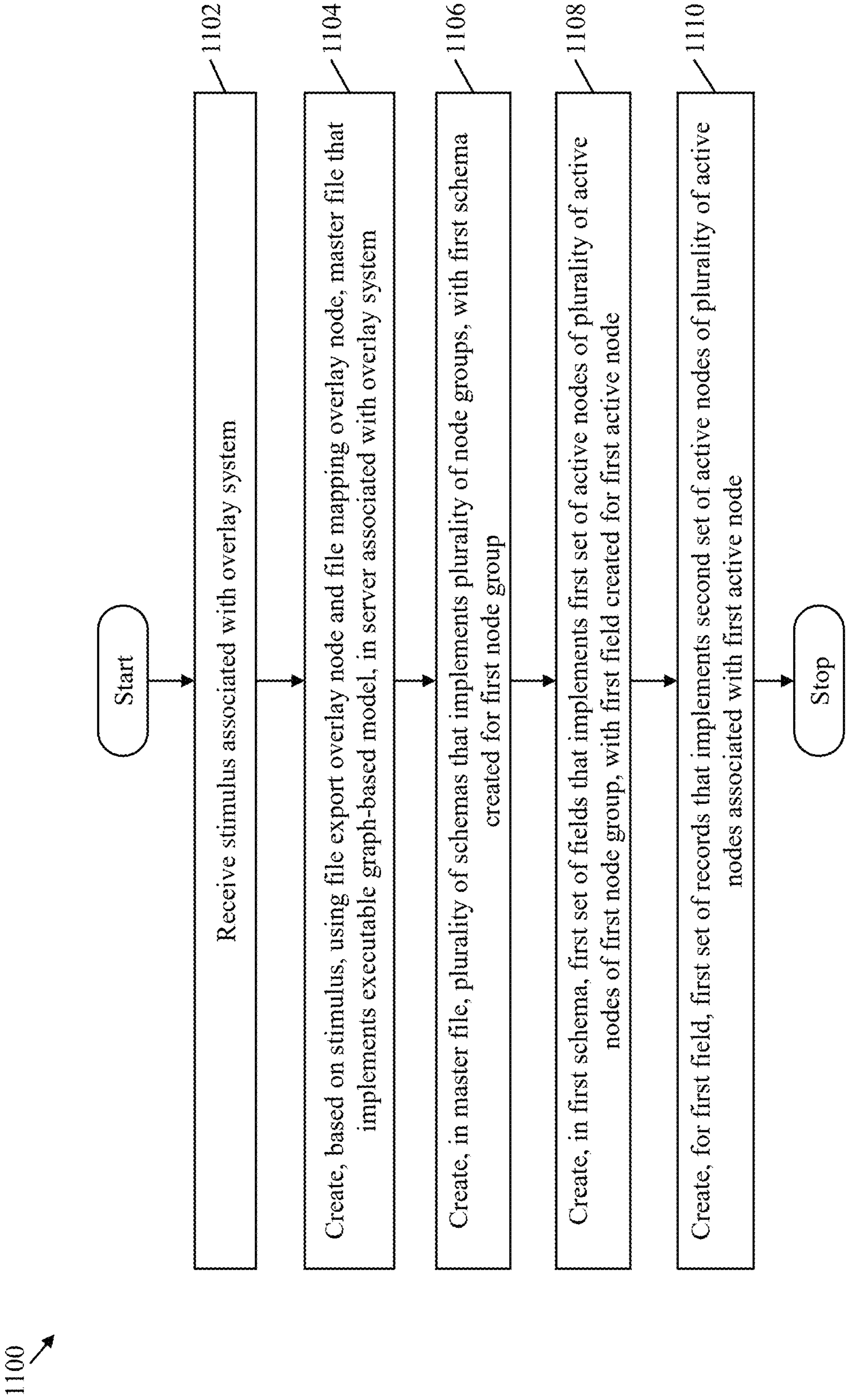
FIG. 11 illustrates a flowchart of a method for the creation of a master file that implements an executable graph-based model, consistent with disclosed embodiments of the present disclosure.

FIG. 11 illustrates a flowchart 1100 of a method for the creation of a master file that implements an executable graph-based model, consistent with disclosed embodiments of the present disclosure. Referring to FIG. 11, at 1102, a stimulus associated with an overlay system is received. The processing circuitry (such as the controller module 206 and the stimuli management module 212) receives the stimulus (for example, the stimulus 238) associated with the overlay system (for example, the overlay system 202). The stimulus is indicative of a creation of a master file (for example, the master file 804) that implements the executable graph-based model (for example, the executable graph-based model 706).

At 1104, based on the stimulus, using a file export overlay node and a file mapping overlay node, the master file that implements the executable graph-based model, in a server associated with the overlay system is created. The processing circuitry (such as the controller module 206, the context module 210, and external file management module 222) creates, based on the stimulus, using the file export overlay node (for example, the file export overlay node 802) and the file mapping overlay node (for example, the file mapping overlay node 710), the master file that implements the executable graph-based model, in the server (for example, the server 244) associated with overlay system.

At 1106, in the master file, a plurality of schemas that implements a plurality of node groups is created, with a first schema created for a first node group. The processing circuitry (such as the controller module 206, the context module 210, and the external file management module 222) creates, in the master file, the plurality of schemas (for example, the plurality of schemas 808) that implements the plurality of node groups (for example, the node groups 712 and 714) is created, with the first schema (for example, the first schema 808*a*) created for the first node group (for example, the node group 712).

At 1108, in the first schema, a first set of fields that implements a first set of active nodes of the plurality of active nodes of the first node group is created, with a first field created for a first active node. The processing circuitry (such as the controller module 206, the context module 210, and external file management module 222) creates, in the first schema, the first set of fields (for example, the set of fields 812) that implements the first set of active nodes (for example, the active nodes 722-726) of the plurality of active nodes (for example, the active node 722 and the active nodes 722*a*-722*c*) of the first node group is created, with the first field (for example, the first field 812*a*) is created for the first active node (for example, the active node 722).

At 1110, for the first field, a first set of records that implements a second set of active nodes associated with the first active node is created. The processing circuitry (such as the controller module 206, the context module 210, and external file management module 222) creates, for the first field, the first set of records (for example, the set of records 814) that implements the second set of active nodes (for example, the set of active nodes 722*a*-722*c*) of plurality of active nodes (for example, the active node 722 and the active nodes 722*a*-722*c*) associated with the first active node (for example, the active node 722).

The disclosed embodiments encompass numerous advantages including a simple and user-friendly implementation of the executable graph-based model 100 that may in turn be used to implement various complex and advanced applications. Further, the disclosed systems and methods allow the effective execution of tasks based on the real-time availability of the data. Further, the time required for translating the schema of the external file to a schema required for the execution of a task may be prevented as intricacies may be handled seamlessly by the overlay system without requiring manual effort. Such implementations as useful in the case of AI and ML applications where real-time processing of data is required for the execution of real-time tasks.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems, and methods for facilitating the executable graph-based models with the external files. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:

a storage element configured to store an executable graph-based model that includes: a plurality of node groups, with each node group comprising a plurality of active nodes;

a file export overlay node that is configured to extend functionality of the executable graph-based model; and a file mapping overlay node that is configured to extend functionality of the file export overlay node; and processing circuitry that is coupled to the storage element, and configured to:

receive a stimulus associated with the overlay system;

create, based on the stimulus, using the file export overlay node and the file mapping overlay node, a master file that implements the executable graph-based model, in a server associated with the overlay system;

create, in the master file, a plurality of schemas that implements the plurality of node groups, with a first schema created for a first node group;

create, in the first schema, a first set of fields that implements a first set of active nodes of the plurality of active nodes of the first node group, with a first field created for a first active node; and create, for the first field, a first set of records that implements a second set of active nodes, of the plurality of active nodes of the first node group, associated with the first active node.

2. The overlay system of 1, wherein the executable graph-based model further includes (i) a schema export overlay node that is configured to extend functionality of the first node group, and (ii) a schema mapping overlay node that is configured to extend functionality of the schema export overlay node, wherein the processing circuitry is further configured to determine, using the schema mapping overlay node, the first node group in the executable graph-based model, and wherein the first schema, that implements the first node group, is created in the master file using the schema export overlay node.

3. The overlay system of 1, wherein the executable graph-based model further includes (i) a data export overlay node that is configured to extend functionality of the first node group, and (ii) a data mapping overlay node that is configured to extend functionality of the data export overlay node, wherein the processing circuitry is further configured to determine, using the data mapping overlay node, the first set of active nodes of the plurality of active nodes of the first node group, and wherein the first set of fields, that implements the first set of active nodes, is created in the master file using the data export overlay node.

4. The overlay system of 3, wherein the processing circuitry is further configured to determine, using the data mapping overlay node, the second set of active nodes associated with the first active node of the first set of active nodes, and wherein the first set of records, that implements the second set of active nodes, is created in the master file using the data export overlay node.

5. The overlay system of 1, wherein one or more operations are executed in the executable graph-based model, wherein the execution of the one or more operations results in a modification of the executable graph-based model, and wherein the processing circuitry is further configured to modify the master file based on the modification of the executable graph-based model.

6. The overlay system of 5, wherein the modification of the executable graph-based model corresponds to at least one of (i) an addition of a third set of active nodes in the first node group of the executable graph-based model, (ii) an update of a first subset of active nodes of the first set of active nodes of the first node group, and (iii) a deletion of a second subset of active nodes of the first set of active nodes.

7. The overlay system of 5, wherein the modification of the executable graph-based model corresponds to at least one of (i) an addition of a third set of active nodes associated with the first active node, (ii) an update of a first subset of active nodes of the second set of active nodes associated with the first active node, and (iii) a deletion of a second subset of active nodes of the second set of active nodes.

8. The overlay system of 5, wherein the modification of the executable graph-based model corresponds to an addition of a third set of active nodes in the first node group of the executable graph-based model, wherein the executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node, and wherein the processing circuitry is further configured to:

identify, using the data mapping overlay node, the third set of active nodes added to the first node group; and create, using the data export overlay node and the creation overlay node, a second set of fields that implements the identified third set of active nodes in the first schema of the master file.

9. The overlay system of 5, wherein the modification of the executable graph-based model corresponds to an addition of a third set of active nodes associated with the first active node, wherein the executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node, and wherein the processing circuitry is further configured to:

identify, using the data mapping overlay node, the third set of active nodes added to the first active node; and create, using the data export overlay node and the creation overlay node, a second set of records that implements the identified third set of active nodes for the first field of the first schema of the master file.

10. The overlay system of 5, wherein the modification of the executable graph-based model corresponds to an update of a subset of active nodes of the first set of active nodes, wherein the executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node, and wherein the processing circuitry is further configured to:

identify, using the data mapping overlay node, the subset of active nodes in the first node group;

identify, using the data mapping overlay node, from the first set of fields, a subset of fields that implements the subset of active nodes; and update, using the data export overlay node and the update overlay node, the subset of fields, of the first set of fields, based on the updated subset of active nodes of the first set of active nodes.

11. The overlay system of 10, wherein the update of the subset of fields, of the first set of fields, is one of periodic or in real-time.

12. The overlay system of 5,
wherein the modification of the executable graph-based model corresponds to an update of a subset of active nodes of the second set of active nodes,
wherein the executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node, and
wherein the processing circuitry is further configured to:
identify, using the data mapping overlay node, the subset of active nodes associated with the first active node;
identify, using the data mapping overlay node, from the first set of records, a subset of records that implements the subset of active nodes; and
update, using the data export overlay node and the update overlay node, the subset of records, of the first set of records, based on the updated subset of active nodes of the second set of active nodes.

13. The overlay system of 12, wherein the update of the subset of records, of the first set of records, is one of periodic or in real-time.

14. The overlay system of 5,
wherein the modification of the executable graph-based model corresponds to a deletion of a subset of active nodes of the first set of active nodes,
wherein the executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node, and
wherein the processing circuitry is further configured to:
identify, using the data mapping overlay node, the subset of active nodes in the first node group;
identify, using the data mapping overlay node, from the first set of fields, a subset of fields that implements the subset of active nodes; and
delete, using the data export overlay node and the delete overlay node, the subset of fields, of the first set of fields, based on the deleted subset of active nodes of the first set of active nodes.

15. The overlay system of 5,
wherein the modification of the executable graph-based model corresponds to a deletion of a subset of active nodes of the second set of active nodes,
wherein the executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node, and
wherein the processing circuitry is further configured to:
identify, using the data mapping overlay node, the subset of active nodes associated with the first active node;
identify, using the data mapping overlay node, from the first set of records, a subset of records that implements the subset of active nodes; and
delete, using the data export overlay node and the delete overlay node, the subset of records, of the first set of records, based on the deleted subset of active nodes of the second set of active nodes.

16. The overlay system of 1,
wherein the executable graph-based model is one of persistable or non-persistable,
wherein based on the executable graph-based model being persistable, the executable graph-based model is stored in the storage element, and
wherein based on the executable graph-based model being non-persistable, the executable graph-based model ceases to exist from the storage element upon expiration of a threshold time-period.

17. The overlay system of 1,
wherein the executable graph-based model is a run-time model that includes (i) an executable graph-based model template that defines a graph structure and (ii) an executable graph-based model instance that is an implementation of the executable graph-based model template, and
wherein the processing circuitry creates the master file that implements the executable graph-based model instance in the server associated with the overlay system.

18. An overlay system, comprising:
a storage element; and
processing circuitry that is coupled to the storage element, and configured to:
receive a stimulus associated with the overlay system;
create, in the storage element, based on the stimulus, an executable graph-based model that implements an external file associated with the overlay system;
create, in the executable graph-based model, a plurality of node groups that implements a plurality of schemas associated with the external file, with a first node group created for a first schema;
create, in the first node group, a first set of active nodes that implements a first set of fields associated with the first schema, with a first active node created for a first field;
create, in the first node group, a second set of active nodes associated with the first active node, wherein the second set of active nodes implements a first set of records associated with the first field; and
execute one or more operations in the executable graph-based model.

19. The overlay system of 18,
wherein the processing circuitry is further configured to:
create, in the storage element, (i) a file import overlay node that is configured to extend functionality of the executable graph-based model, and (ii) a file mapping overlay node that is configured to extend functionality of the file import overlay node; and
determine, using the file import overlay node, the first schema of the plurality of schemas, wherein the first node group, that implements the first schema, is created using the file mapping overlay node.

20. The overlay system of 18, wherein the processing circuitry is further configured to:
create, in the executable graph-based model, a schema import overlay node that is configured to extend functionality of the first node group, and a schema mapping overlay node that is configured to extend functionality of the schema import overlay node; and
determine, using the schema import overlay node, the first field of the first set of fields associated with the first schema, wherein the first active node, that implements the first field, is created using the schema mapping overlay node.

21. The overlay system of 20, wherein the processing circuitry is further configured to:

create, in the executable graph-based model, a data import overlay node that is configured to extend functionality of the first node group, and a data mapping overlay node that is configured to extend functionality of the data import overlay node; and determine, using the data import overlay node, the first set of records associated with the first field, wherein the second set of active nodes, that implements the first set of records, is created using the data mapping overlay node.

22. A method, comprising:

receiving, by processing circuitry of an overlay system, a stimulus associated with the overlay system, wherein an executable graph-based model is stored in a storage element of the overlay system, and wherein the executable graph-based model includes:

a plurality of node groups, with each node group comprising a plurality of active nodes, a file export overlay node that is configured to extend functionality of the executable graph-based model, and a file mapping overlay node that is configured to extend functionality of the file export overlay node;

creating, by the processing circuitry, based on the stimulus, using the file export overlay node and the file mapping overlay node, a master file that implements the executable graph-based model, in a server associated with the overlay system;

creating, by the processing circuitry, in the master file, a plurality of schemas that implements the plurality of node groups, with a first schema created for a first node group;

creating, by the processing circuitry, in the first schema, a first set of fields that implements a first set of active nodes of the plurality of active nodes of the first node group, with a first field created for a first active node; and creating, by the processing circuitry, for the first field, a first set of records that implements a second set of active nodes, of the plurality of active nodes of the first node group, associated with the first active node.

What is claimed is:

1. An overlay system, comprising:

a storage element configured to store an executable graph-based model that includes:

a plurality of node groups, with each node group comprising a plurality of active nodes;

a file export overlay node that is configured to extend functionality of the executable graph-based model; and a file mapping overlay node that is configured to extend functionality of the file export overlay node; and processing circuitry that is coupled to the storage element, and configured to:

receive a stimulus associated with the overlay system;

create, based on the stimulus, using the file export overlay node and the file mapping overlay node, a master file that implements the executable graph-based model, in a server associated with the overlay system;

create, in the master file, a plurality of schemas that implements the plurality of node groups, with a first schema created for a first node group;

create, in the first schema, a first set of fields that implements a first set of active nodes of the plurality of active nodes of the first node group, with a first field created for a first active node; and create, for the first field, a first set of records that implements a second set of active nodes, of the plurality of active nodes of the first node group, associated with the first active node.

2. The overlay system of claim 1, wherein the executable graph-based model further includes (i) a schema export overlay node that is configured to extend functionality of the first node group, and (ii) a schema mapping overlay node that is configured to extend functionality of the schema export overlay node, wherein the processing circuitry is further configured to determine, using the schema mapping overlay node, the first node group in the executable graph-based model, and wherein the first schema, that implements the first node group, is created in the master file using the schema export overlay node.

3. The overlay system of claim 1, wherein the executable graph-based model further includes (i) a data export overlay node that is configured to extend functionality of the first node group, and (ii) a data mapping overlay node that is configured to extend functionality of the data export overlay node, wherein the processing circuitry is further configured to determine, using the data mapping overlay node, the first set of active nodes of the plurality of active nodes of the first node group, and wherein the first set of fields, that implements the first set of active nodes, is created in the master file using the data export overlay node.

4. The overlay system of claim 3, wherein the processing circuitry is further configured to determine, using the data mapping overlay node, the second set of active nodes associated with the first active node of the first set of active nodes, and wherein the first set of records, that implements the second set of active nodes, is created in the master file using the data export overlay node.

5. The overlay system of claim 1, wherein one or more operations are executed in the executable graph-based model, wherein the execution of the one or more operations results in a modification of the executable graph-based model, and wherein the processing circuitry is further configured to modify the master file based on the modification of the executable graph-based model.

6. The overlay system of claim 5, wherein the modification of the executable graph-based model corresponds to at least one of (i) an addition of a third set of active nodes in the first node group of the executable graph-based model, (ii) an update of a first subset of active nodes of the first set of active nodes of the first node group, and (iii) a deletion of a second subset of active nodes of the first set of active nodes.

7. The overlay system of claim 5, wherein the modification of the executable graph-based model corresponds to at least one of (i) an addition of a third set of active nodes associated with the first active node, (ii) an update of a first subset of active nodes of the second set of active nodes associated with the first active node, and (iii) a deletion of a second subset of active nodes of the second set of active nodes.

8. The overlay system of claim 5, wherein the modification of the executable graph-based model corresponds to an addition of a third set of active nodes in the first node group of the executable graph-based model, wherein the executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node, and wherein the processing circuitry is further configured to:

identify, using the data mapping overlay node, the third set of active nodes added to the first node group; and create, using the data export overlay node and the creation overlay node, a second set of fields that implements the identified third set of active nodes in the first schema of the master file.

9. The overlay system of claim 5, wherein the modification of the executable graph-based model corresponds to an addition of a third set of active nodes associated with the first active node, wherein the executable graph-based model further comprises (i) a data export overlay node that is configured to extend functionality of the first node group, (ii) a data mapping overlay node that is configured to extend functionality of the data export overlay node, and (iii) a creation overlay node that is configured to extend functionality of the data export overlay node, and wherein the processing circuitry is further configured to:

identify, using the data mapping overlay node, the third set of active nodes added to the first active node; and create, using the data export overlay node and the creation overlay node, a second set of records that implements the identified third set of active nodes for the first field of the first schema of the master file.

10. The overlay system of claim 5, wherein the modification of the executable graph-based model corresponds to an update of a subset of active nodes of the first set of active nodes, wherein the executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node, and wherein the processing circuitry is further configured to:

identify, using the data mapping overlay node, the subset of active nodes in the first node group;

identify, using the data mapping overlay node, from the first set of fields, a subset of fields that implements the subset of active nodes; and update, using the data export overlay node and the update overlay node, the subset of fields, of the first set of fields, based on the updated subset of active nodes of the first set of active nodes.

11. The overlay system of claim 10, wherein the update of the subset of fields, of the first set of fields, is one of periodic or in real-time.

12. The overlay system of claim 5, wherein the modification of the executable graph-based model corresponds to an update of a subset of active nodes of the second set of active nodes, wherein the executable graph-based model further comprises (i) a data export overlay node that is configured to extend functionality of the first node group, (ii) a data mapping overlay node that is configured to extend functionality of the data export overlay node, and (iii) an update overlay node that is configured to extend functionality of the data export overlay node, and wherein the processing circuitry is further configured to:

identify, using the data mapping overlay node, the subset of active nodes associated with the first active node;

identify, using the data mapping overlay node, from the first set of records, a subset of records that implements the subset of active nodes; and update, using the data export overlay node and the update overlay node, the subset of records, of the first set of records, based on the updated subset of active nodes of the second set of active nodes.

13. The overlay system of claim 12, wherein the update of the subset of records, of the first set of records, is one of periodic or in real-time.

14. The overlay system of claim 5, wherein the modification of the executable graph-based model corresponds to a deletion of a subset of active nodes of the first set of active nodes, wherein the executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node, and wherein the processing circuitry is further configured to:

identify, using the data mapping overlay node, the subset of active nodes in the first node group;

identify, using the data mapping overlay node, from the first set of fields, a subset of fields that implements the subset of active nodes; and delete, using the data export overlay node and the delete overlay node, the subset of fields, of the first set of fields, based on the deleted subset of active nodes of the first set of active nodes.

15. The overlay system of claim 5, wherein the modification of the executable graph-based model corresponds to a deletion of a subset of active nodes of the second set of active nodes, wherein the executable graph-based model further comprises (i) a data export overlay node that is configured to extend functionality of the first node group, (ii) a data mapping overlay node that is configured to extend functionality of the data export overlay node, and (iii) a delete overlay node that is configured to extend functionality of the data export overlay node, and wherein the processing circuitry is further configured to:

identify, using the data mapping overlay node, the subset of active nodes associated with the first active node;

identify, using the data mapping overlay node, from the first set of records, a subset of records that implements the subset of active nodes; and delete, using the data export overlay node and the delete overlay node, the subset of records, of the first set of records, based on the deleted subset of active nodes of the second set of active nodes.

16. The overlay system of claim 1, wherein the executable graph-based model is a run-time model that includes (i) an executable graph-based model template that defines a graph structure and (ii) an executable graph-based model instance that is an implementation of the executable graph-based model template, and wherein the processing circuitry creates the master file that implements the executable graph-based model instance in the server associated with the overlay system.

17. A method, comprising:

receiving, by processing circuitry of an overlay system, a stimulus associated with the overlay system, wherein an executable graph-based model is stored in a storage element of the overlay system, and wherein the executable graph-based model includes:

a plurality of node groups, with each node group comprising a plurality of active nodes, a file export overlay node that is configured to extend functionality of the executable graph-based model, and a file mapping overlay node that is configured to extend functionality of the file export overlay node;

creating, by the processing circuitry, based on the stimulus, using the file export overlay node and the file mapping overlay node, a master file that implements the executable graph-based model, in a server associated with the overlay system;

creating, by the processing circuitry, in the master file, a plurality of schemas that implements the plurality of node groups, with a first schema created for a first node group;

creating, by the processing circuitry, in the first schema, a first set of fields that implements a first set of active nodes of the plurality of active nodes of the first node group, with a first field created for a first active node; and creating, by the processing circuitry, for the first field, a first set of records that implements a second set of active nodes, of the plurality of active nodes of the first node group, associated with the first active node.

18. A non-transitory computer-readable medium including computer-readable instructions executable by at least one processor to:

receive a stimulus associated with an overlay system, wherein:

an executable graph-based model is stored in a storage element of the overlay system, and the executable graph-based model includes:

a plurality of node groups, with each node group comprising a plurality of active nodes, a file export overlay node that is configured to extend functionality of the executable graph-based model, and a file mapping overlay node that is configured to extend functionality of the file export overlay node;

create, based on the stimulus, using the file export overlay node and the file mapping overlay node, a master file that implements the executable graph-based model, in a server associated with the overlay system;

create, in the master file, a plurality of schemas that implements the plurality of node groups, with a first schema created for a first node group;

create, in the first schema, a first set of fields that implements a first set of active nodes of the plurality of active nodes of the first node group, with a first field created for a first active node; and create, for the first field, a first set of records that implements a second set of active nodes, of the plurality of active nodes of the first node group, associated with the first active node.

* * * * *